(12) United States Patent
Fujishiro et al.

(10) Patent No.: US 12,713,290 B2
(45) Date of Patent: Aug. 18, 2026

(54) COMMUNICATION METHOD AND COMMUNICATION APPARATUS

(71) Applicant: KYOCERA Corporation, Kyoto (JP)

(72) Inventors: Masato Fujishiro, Yokohama (JP); Mitsutaka Hata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 323 days.

(21) Appl. No.: 18/410,678

(22) Filed: Jan. 11, 2024

(65) Prior Publication Data

US 2024/0147306 A1 May 2, 2024

Related U.S. Application Data

(63) Continuation of application No. PCT/JP2022/027045, filed on Jul. 8, 2022.

(30) Foreign Application Priority Data

Jul. 12, 2021 (JP) ................................ 2021-115339

(51) Int. Cl.
*H04W 28/06* (2009.01)
*H04W 76/20* (2018.01)
*H04W 80/02* (2009.01)

(52) U.S. Cl.
CPC ........... *H04W 28/06* (2013.01); *H04W 76/20* (2018.02); *H04W 80/02* (2013.01)

(58) Field of Classification Search
CPC .... H04L 69/00; H04W 28/06; H04W 28/065; H04W 76/20; H04W 80/02
See application file for complete search history.

(56) References Cited

U.S. PATENT DOCUMENTS 8,331,399 B2 * 12/2012 Meylan ................... H04L 1/008 370/466
2011/0038313 A1 * 2/2011 Park .................... H04W 28/065 370/328
2016/0373962 A1 * 12/2016 Wang .................. H04W 28/065
2018/0097918 A1 * 4/2018 Nuggehalli ........... H04L 5/0091

FOREIGN PATENT DOCUMENTS

JP 2012-004823 A 1/2012
WO WO-2008137962 A2 * 11/2008 ............. H04L 1/008
WO WO-2009035262 A1 * 3/2009 ........... H04L 1/1614

OTHER PUBLICATIONS

3rd Generation Partnership Project; Technical Specification Group Radio Access Network; NR; Packet Data Convergence Protocol (PDCP) specification; (Release 16); 3GPP TS 38.323 V16.3.0; Mar. 2021; pp. 1-40.

* cited by examiner

*Primary Examiner* — Phuc H Tran
(74) *Attorney, Agent, or Firm* — Studebaker Brackett PLLC

(57) ABSTRACT

A transmission-side PDCP entity performs PDCP concatenation processing of concatenating a plurality of PDCP Service Data Units (SDUs) and thereby generates a PDCP PDU including a concatenated SDU. A reception-side PDCP entity performs PDCP segmentation processing of segmenting the concatenated SDU included in the PDCP PDU into the plurality of PDCP SDUs. A first communication apparatus including one PDCP entity transmits control information used for control of the PDCP concatenation processing and/or the PDCP segmentation processing to a second communication apparatus including the other PDCP entity.

19 Claims, 16 Drawing Sheets

100
200
300
UE
gNB
AMF
NAS
NAS
RRC
RRC
PDCP
PDCP
RLC
RLC
MAC
MAC
PHY
PHY

PDCP PDU

CONCATENATED SDU

| PDCP HEADER | PDCP SDU | PDCP SDU | PDCP SDU |
| --- | --- | --- | --- |

COMMUNICATION METHOD AND COMMUNICATION APPARATUS

RELATED APPLICATIONS

The present application is a continuation based on PCT Application No. PCT/JP2022/027045, filed on Jul. 8, 2022, which claims the benefit of Japanese Patent Application No. 2021-115339 filed on Jul. 12, 2021. The content of which is incorporated by reference herein in their entirety.

TECHNICAL FIELD

The present disclosure relates to a communication method and a communication apparatus used in a mobile communication system.

BACKGROUND OF INVENTION

In a mobile communication system conforming to 3rd Generation Partnership Project (3GPP) standards, as a protocol for performing header compression and decompression, coding and decoding, and the like, a Packet Data Convergence Protocol (PDCP) is used (for example, see Non-Patent Document 1).

In communication between a base station and a user equipment, a transmission-side PDCP entity adds a PDCP header to a PDCP Service Data Unit (SDU) from a higher layer and thereby generates a PDCP Protocol Data Unit (PDU). Subsequently, a transmission-side Radio Link Control (RLC) entity and a transmission-side Medium Access Control (MAC) entity add an RLC header and a MAC header, respectively.

CITATION LIST

Non-Patent Literature

Non-Patent Document 1: 3GPP Technical Specification: TS 38.323 V16.3.0 (2021-03), "Packet Data Convergence Protocol (PDCP) specification (Release 16)"

SUMMARY

Solution to Problem

In a first aspect, a communication method is used in a mobile communication system including a pair of Packet Data Convergence Protocol (PDCP) entities including a transmission-side PDCP entity for transmitting a PDCP Protocol Data Unit (PDU) and a reception-side PDCP entity for receiving the PDCP PDU. The communication method includes: performing, by a transmission-side PDCP entity, PDCP concatenation processing of concatenating a plurality of PDCP Service Data Units (SDUs) and thereby generating a PDCP PDU including a concatenated SDU; performing, by a reception-side PDCP entity, PDCP segmentation processing of segmenting the concatenated SDU included in the PDCP PDU into the plurality of PDCP SDUs; and transmitting control information used for control of the PDCP concatenation processing and/or the PDCP segmentation processing from a first communication apparatus including one of a pair of PDCP entities to a second communication apparatus including the other of the pair of PDCP entities.

In a second aspect, a communication apparatus is an apparatus used in a mobile communication system including a pair of Packet Data Convergence Protocol (PDCP) entities including a transmission-side PDCP entity for transmitting a PDCP Protocol Data Unit (PDU) and a reception-side PDCP entity for receiving the PDCP PDU. The communication apparatus includes a controller including one of a transmission-side PDCP entity and a reception-side PDCP entity. The transmission-side PDCP entity is configured to perform PDCP concatenation processing of concatenating a plurality of PDCP Service Data Units (SDUs) and thereby generate a PDCP PDU including a concatenated SDU. The reception-side PDCP entity is configured to perform PDCP segmentation processing of segmenting the concatenated SDU included in the PDCP PDU into the plurality of PDCP SDUs. The controller is configured to transmit control information used for control of the PDCP concatenation processing and/or the PDCP segmentation processing to another communication apparatus.

DESCRIPTION OF EMBODIMENTS

As described above, when a PDCP header, an RLC header, and a MAC header are added to one PDCP SDU, there is a problem in that a ratio of the headers in communication between a base station and a user equipment, in other words, overhead, increases. The size of an Internet Protocol (IP) packet corresponding to the PDCP SDU is in many cases small relative to a maximum size (for example, 9 kB) of the PDCP SDU, and for example, the size of the IP packet may be 1.5 kB. Thus, it is difficult to perform efficient PDCP processing.

In view of this, the present disclosure has an object to enable implementation of efficient communication in a mobile communication system.

A mobile communication system according to an embodiment is described with reference to the drawings. In the description of the drawings, the same or similar parts are denoted by the same or similar reference signs.

Figure 1:
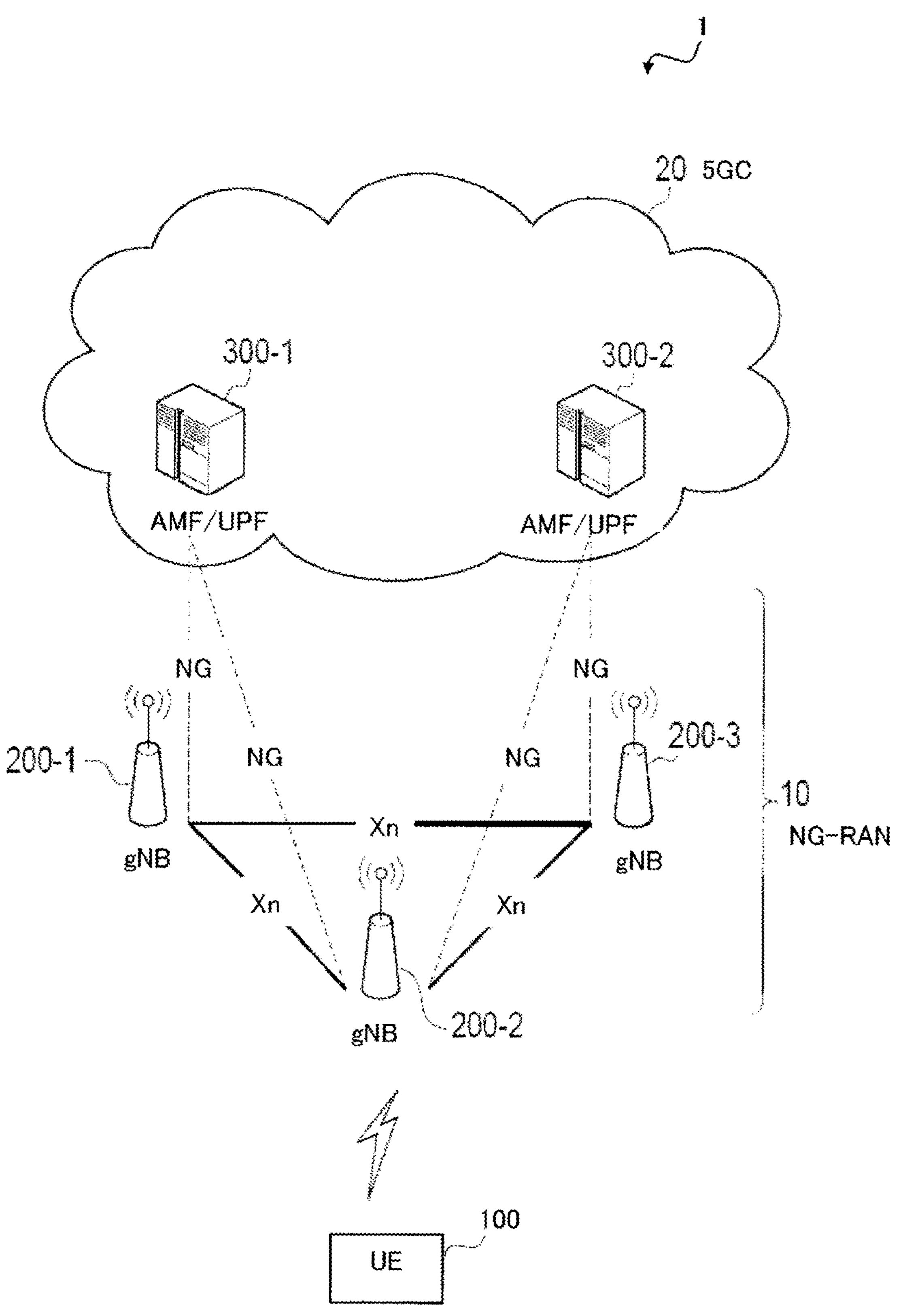
FIG. 1 is a diagram illustrating a configuration of a mobile communication system according to an embodiment.

Configuration of Mobile Communication System First, with reference to FIG. 1 to FIG. 6, a configuration of a mobile communication system according to an embodiment will be described. FIG. 1 is a diagram illustrating a configuration of the mobile communication system according to an embodiment. A mobile communication system 1 complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

The mobile communication system 1 includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone) or a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and the UPF are connected to the gNB 200 via an NG interface which is an interface between a base station and the core network.

Figure 2:
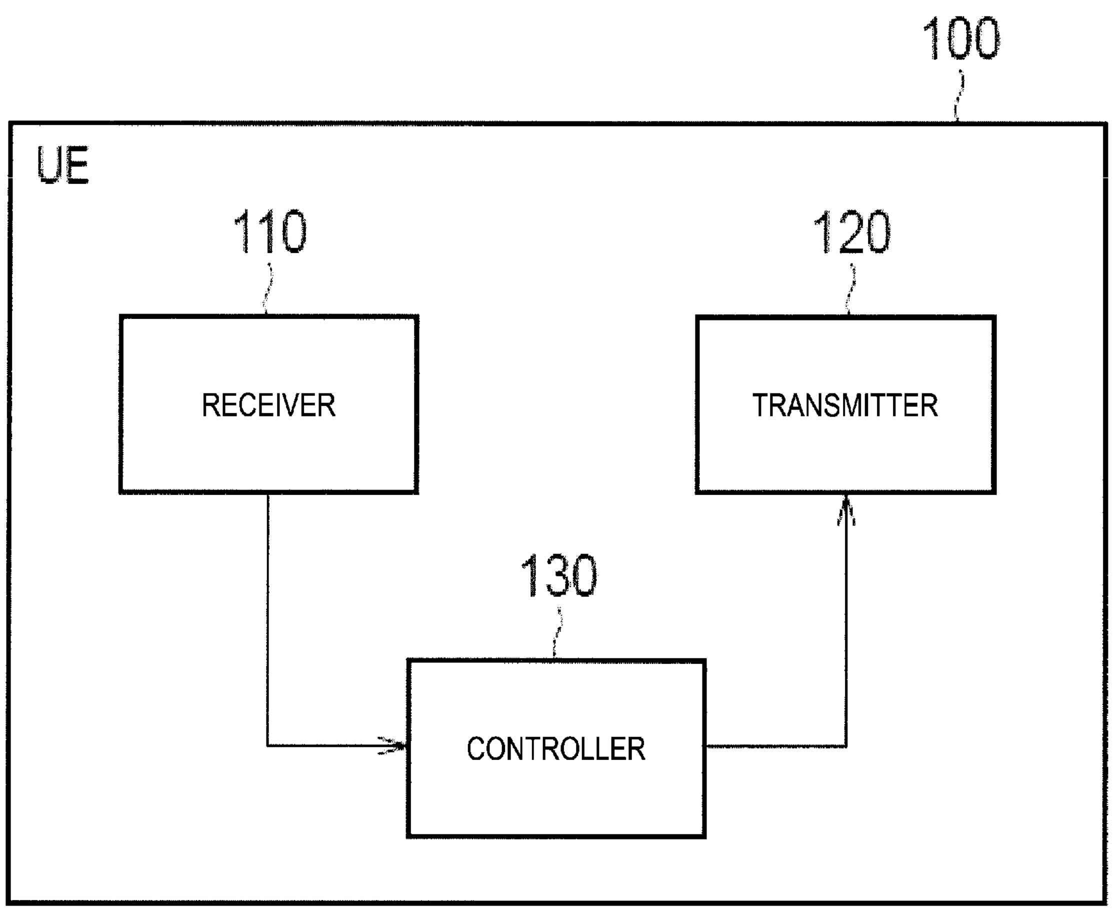
FIG. 2 is a diagram illustrating a configuration of a user equipment (UE) according to an embodiment.

FIG. 2 is a diagram illustrating a configuration of the user equipment (UE) 100 according to an embodiment. The UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. Such processes include processes of respective layers to be described below. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
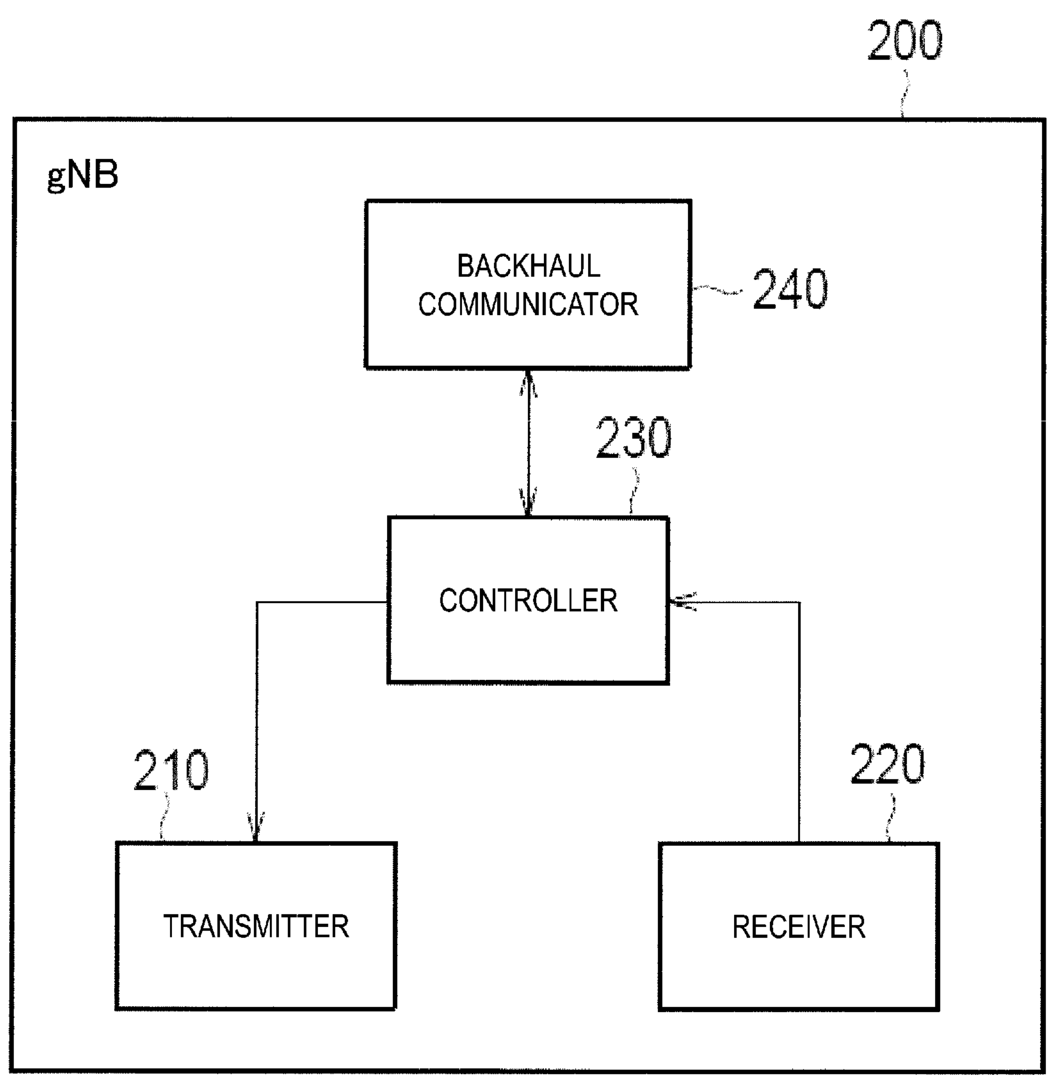
FIG. 3 is a diagram illustrating a configuration of a base station (gNB) according to an embodiment.

FIG. 3 is a diagram illustrating a configuration of the base station (gNB) 200 according to an embodiment. The gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processes in the gNB 200. Such processes include processes of respective layers to be described below. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figures 4, 5:
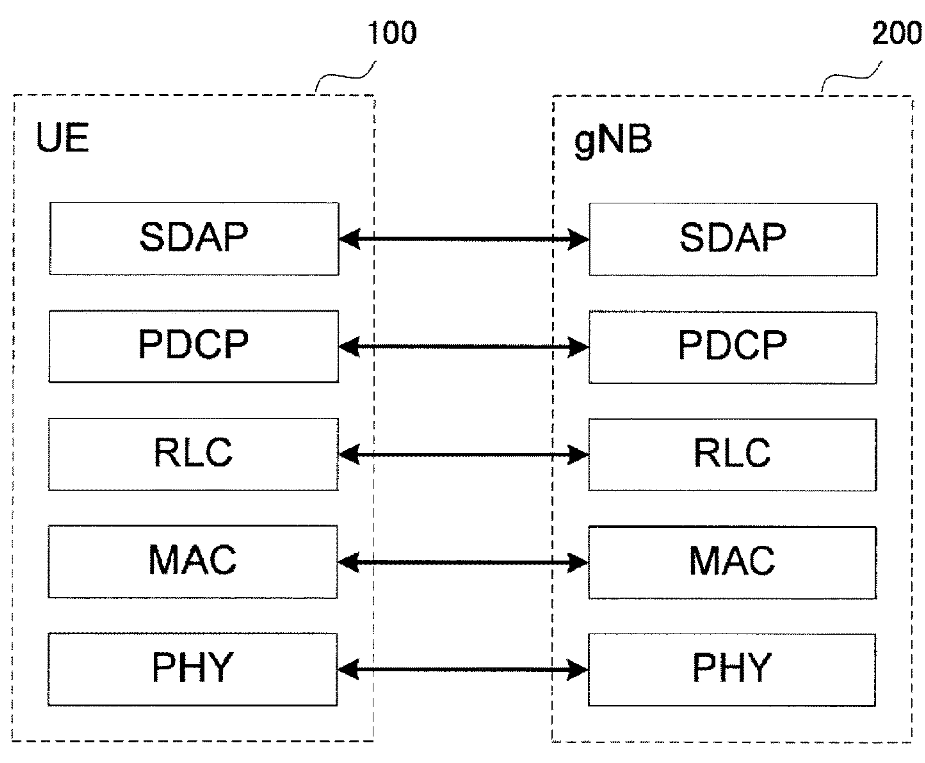
FIG. 4 is a diagram illustrating a configuration of a protocol stack of a radio interface of a user plane handling data.
FIG. 5 is a diagram illustrating a configuration of a protocol stack of a radio interface of a control plane handling signaling (control signal).

FIG. 4 is a diagram illustrating a configuration of a protocol stack of a radio interface of a user plane handling data.

A radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

FIG. 5 is a diagram illustrating a configuration of a protocol stack of a radio interface of a control plane handling signaling (a control signal).

The protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned upper than the RRC layer performs session management, mobility management, and the like. NAS signaling is transmitted between the NAS layer of the UE 100 and the NAS layer of the AMF 300.

Note that the UE 100 includes an application layer other than the protocol of the radio interface.

Figures 6, 7:
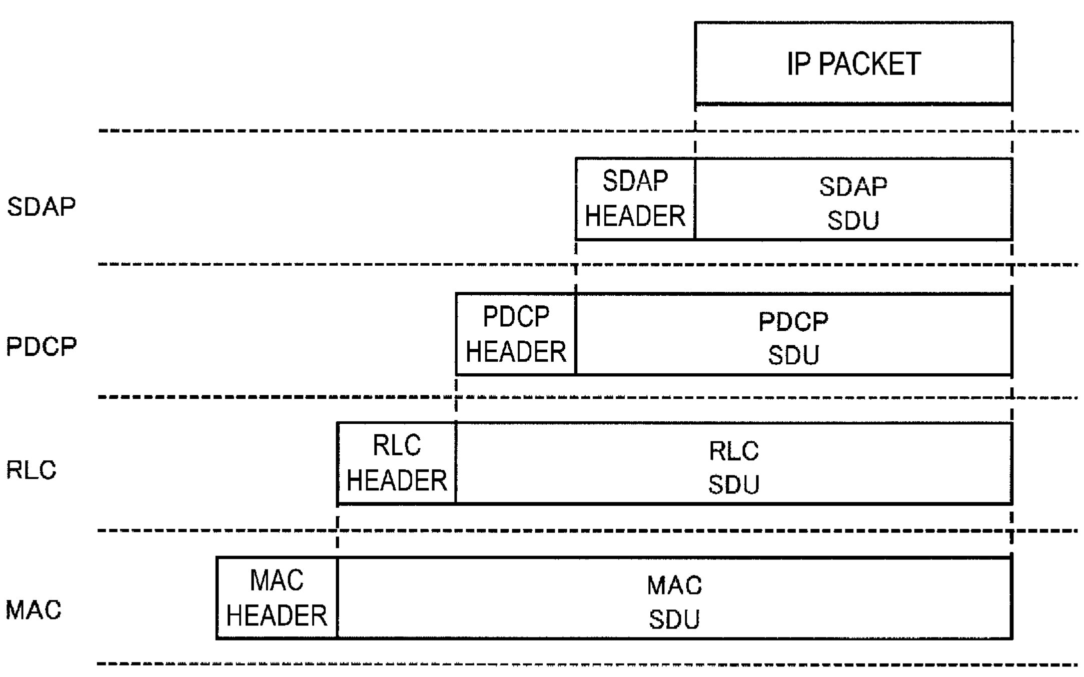
FIG. 6 is a diagram illustrating an example of processing of each layer in the protocol stack of the radio interface of the user plane.
FIG. 7 is a diagram illustrating a PDCP PDU according to an embodiment.

FIG. 6 is a diagram illustrating an example of processing of each layer in the protocol stack of the radio interface of the user plane.

Firstly, processing on a transmission side will be described. A transmission-side SDAP entity, which is an entity of the SDAP layer on the transmission side, receives an IP packet to be transmitted to a reception side as an SDAP SDU, performs transmission processing of the SDAP layer, adds an SDAP header to the SDAP SDU, and thereby generates an SDAP PDU and outputs the SDAP PDU to a lower layer.

A transmission-side PDCP entity, which is an entity of the PDCP layer on the transmission side, receives an SDAP PDU as a PDCP SDU, performs transmission processing of the PDCP layer, adds a PDCP header to the PDCP SDU, and thereby generates a PDCP PDU and outputs the PDCP PDU to a lower layer.

A transmission-side RLC entity, which is an entity of the RLC layer on the transmission side, receives a PDCP PDU as an RLC SDU, performs transmission processing of the RLC layer, adds an RLC header to the RLC SDU, and thereby generates an RLC PDU and outputs the RLC PDU to a lower layer.

A transmission-side MAC entity, which is an entity of the MAC layer on the transmission side, receives an RLC PDU as a MAC SDU, performs transmission processing of the MAC layer, adds a MAC header to the MAC SDU, and thereby generates a MAC PDU and outputs the MAC PDU to a lower layer.

Secondly, processing on a reception side will be described. A reception-side MAC entity, which is an entity of the MAC layer on the reception side, receives a MAC PDU from a lower layer, performs reception processing of the MAC layer based on a MAC header, removes the MAC header, and thereby outputs a MAC SDU to a higher layer.

A reception-side RLC entity, which is an entity of the RLC layer on the reception side, receives a MAC SDU from a lower layer as an RLC PDU, performs reception processing of the RLC layer based on an RLC header, removes the RLC header, and thereby outputs an RLC SDU to a higher layer.

A reception-side PDCP entity, which is an entity of the PDCP layer on the reception side, receives an RLC SDU from a lower layer as a PDCP PDU, performs reception processing of the PDCP layer based on the PDCP header, removes the PDCP header, and thereby outputs the PDCP SDU to a higher layer.

A reception-side SDAP entity, which is an entity of the SDAP layer on the reception side, receives a PDCP SDU from a lower layer as an SDAP PDU, performs reception processing of the SDAP layer based on the SDAP header, removes the SDAP header, and thereby outputs the SDAP SDU (IP packet) to a higher layer.

Operation of Mobile Communication System

With reference to FIG. 7 to FIG. 10, operation of the mobile communication system 1 according to an embodiment will be described. The mobile communication system 1 according to an embodiment includes a pair of PDCP entities including a transmission-side PDCP entity 50T that transmits the PDCP PDU and a reception-side PDCP entity 50R that receives the PDCP PDU (see FIG. 8 and FIG. 9).

As described above, in communication between the gNB 200 and the UE 100, the transmission-side PDCP entity adds a PDCP header to the PDCP SDU from a higher layer, and thereby generates the PDCP PDU. Subsequently, the transmission-side RLC entity and the transmission-side MAC entity add an RLC header and a MAC header, respectively. In this manner, the PDCP header, the RLC header, and the MAC header are added to one PDCP SDU, and thus there is a problem in that a ratio of the headers in communication between the gNB 200 and the UE 100, in other words, overhead, is large. The size of an IP packet corresponding to the PDCP SDU is in many cases small relative to a maximum size (for example, 9 kB) of the PDCP SDU, and for example, the size of the IP packet may be 1.5 kB. Thus, it is difficult to perform efficient PDCP processing.

FIG. 7 is a diagram illustrating the PDCP PDU according to an embodiment. The transmission-side PDCP entity 50T performs PDCP concatenation processing (PDCP Concatenation) of concatenating a plurality of PDCP SDUs, and thereby generates the PDCP PDU including a concatenated SDU. Although FIG. 7 illustrates an example in which the transmission-side PDCP entity 50T concatenates three PDCP SDUs, the number of PDCP SDUs to be concatenated may be two, or may be four or more. As will be described below in detail, the transmission-side PDCP entity 50T may insert partition codes between the concatenated PDCP SDUs (see FIG. 8 and FIG. 9). With the partition codes, the reception-side PDCP entity 50R can easily segment the PDCP SDUs apart from each other. The reception-side PDCP entity 50R performs PDCP segmentation processing of segmenting the concatenated SDU included in the PDCP PDU into the plurality of PDCP SDUs.

Through such PDCP concatenation processing, the ratio of the headers in communication between the gNB 200 and the UE 100, in other words, overhead, can be reduced. The PDCP processing can be applied to the concatenated SDU of a size close to the maximum size (for example, 9 kB) of the PDCP SDU, and therefore efficient PDCP processing can be performed.

Figure 8:
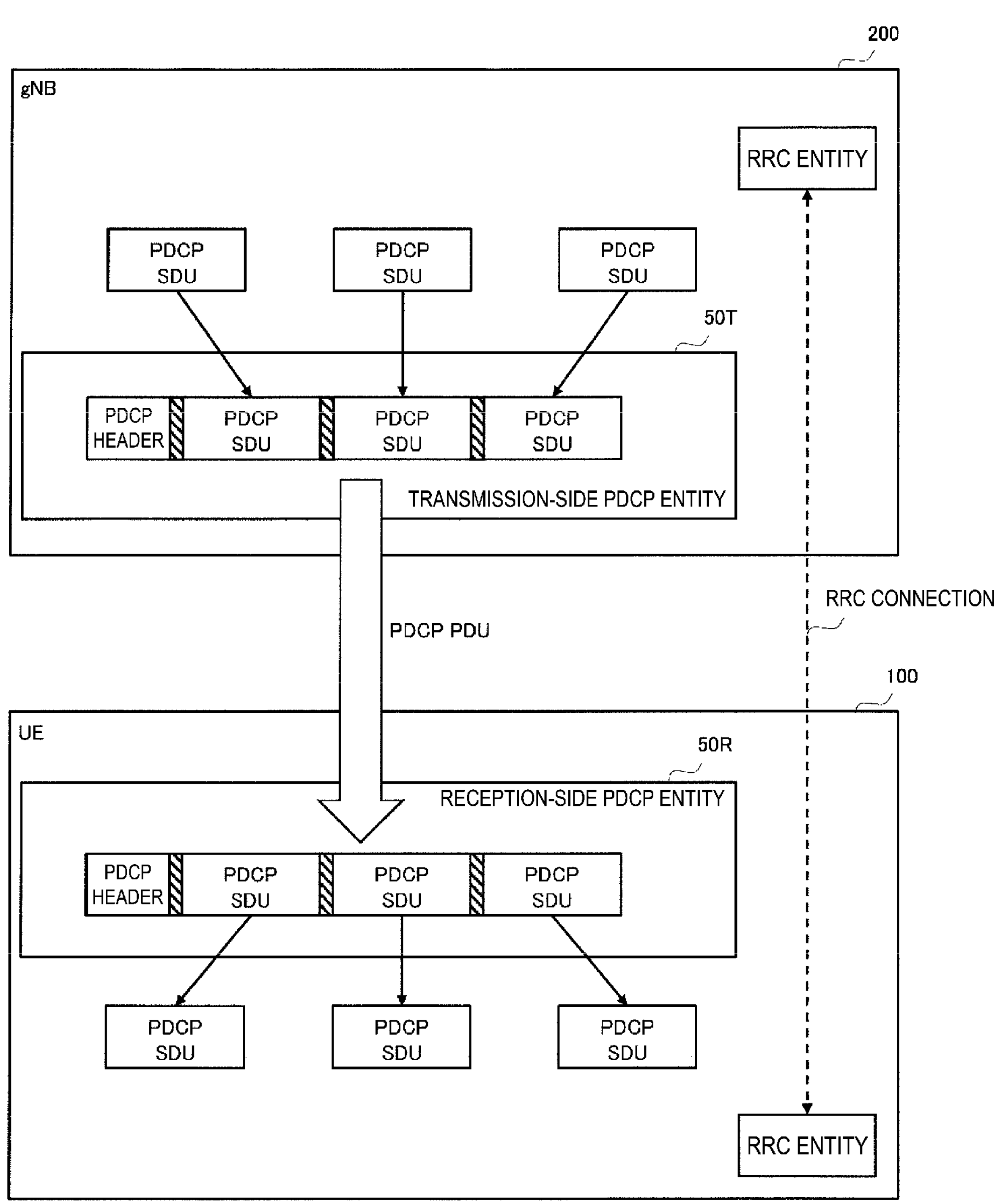
FIG. 8 is a diagram illustrating PDCP concatenation processing and PDCP segmentation processing in a downlink according to an embodiment.
Figure 9:
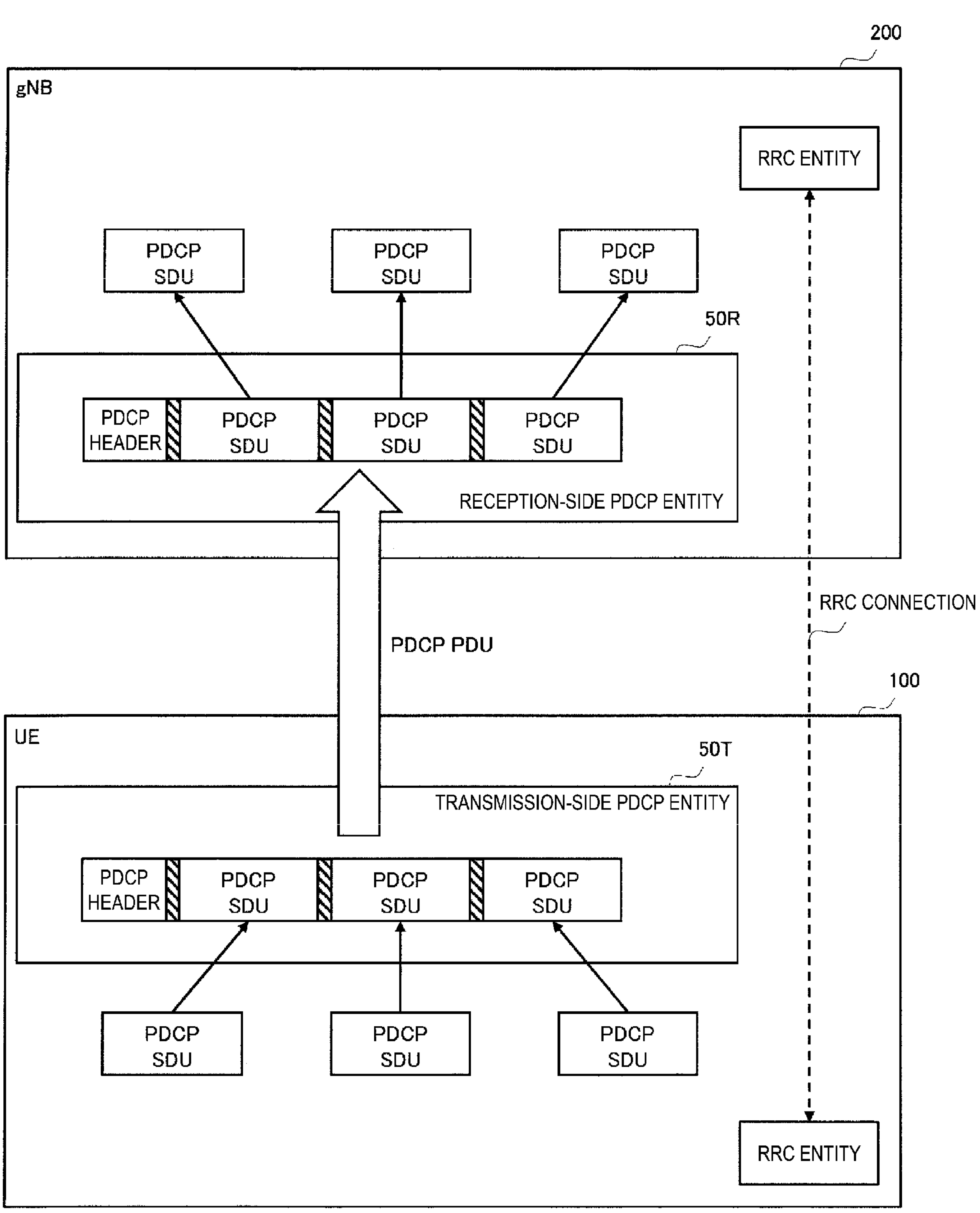
FIG. 9 is a diagram illustrating PDCP concatenation processing and PDCP segmentation processing in an uplink according to an embodiment.

FIG. 8 is a diagram illustrating the PDCP concatenation processing and the PDCP segmentation processing in the downlink according to an embodiment. FIG. 9 is a diagram illustrating the PDCP concatenation processing and the PDCP segmentation processing in the uplink according to an embodiment. In FIG. 8 and FIG. 9, RRC connection is established between the RRC entity of the gNB 200 and the RRC entity of the UE 100 (in other words, an RRC connected state). Note that, although FIG. 8 and FIG. 9 illustrate an example in which the partition codes are used, the partition codes need not necessarily be used.

As illustrated in FIG. 8, in the downlink, the transmission-side PDCP entity 50T of the gNB 200 performs the PDCP concatenation processing of concatenating a plurality of PDCP SDUs, and thereby generates the PDCP PDU including the concatenated SDU and transmits the PDCP PDU. The reception-side PDCP entity 50R of the UE 100 receives the PDCP PDU, and performs the PDCP segmentation processing of segmenting the concatenated SDU included in the PDCP PDU into the plurality of PDCP SDUs.

As illustrated in FIG. 9, in the uplink, the transmission-side PDCP entity 50T of the UE 100 performs the PDCP concatenation processing of concatenating a plurality of PDCP SDUs, and thereby generates the PDCP PDU including the concatenated SDU and transmits the PDCP PDU. The reception-side PDCP entity 50R of the gNB 200 receives the PDCP PDU, and performs the PDCP segmentation processing of segmenting the concatenated SDU included in the PDCP PDU into the plurality of PDCP SDUs.

Note that description will mainly be given to a case in which the PDCP concatenation processing and the PDCP segmentation processing are applied to the downlink and the uplink, but the PDCP concatenation processing and the PDCP segmentation processing may be applied to a sidelink being a direct link between the UEs. In the sidelink, the transmission-side PDCP entity 50T of one UE performs the PDCP concatenation processing of concatenating a plurality of PDCP SDUs, and thereby generates the PDCP PDU including the concatenated SDU and transmits the PDCP PDU. The reception-side PDCP entity 50R of another UE receives the PDCP PDU, and performs the PDCP segmentation processing of segmenting the concatenated SDU included in the PDCP PDU into the plurality of PDCP SDUs. Note that, in application to the sidelink, concatenation and segmentation control information to be described below may be transmitted on a PC5-RRC message. The PDCP concatenation processing and the PDCP segmentation processing may be applied to dual connectivity (DC), multi-connectivity (MC), a split bearer, or the like.

Figure 10:
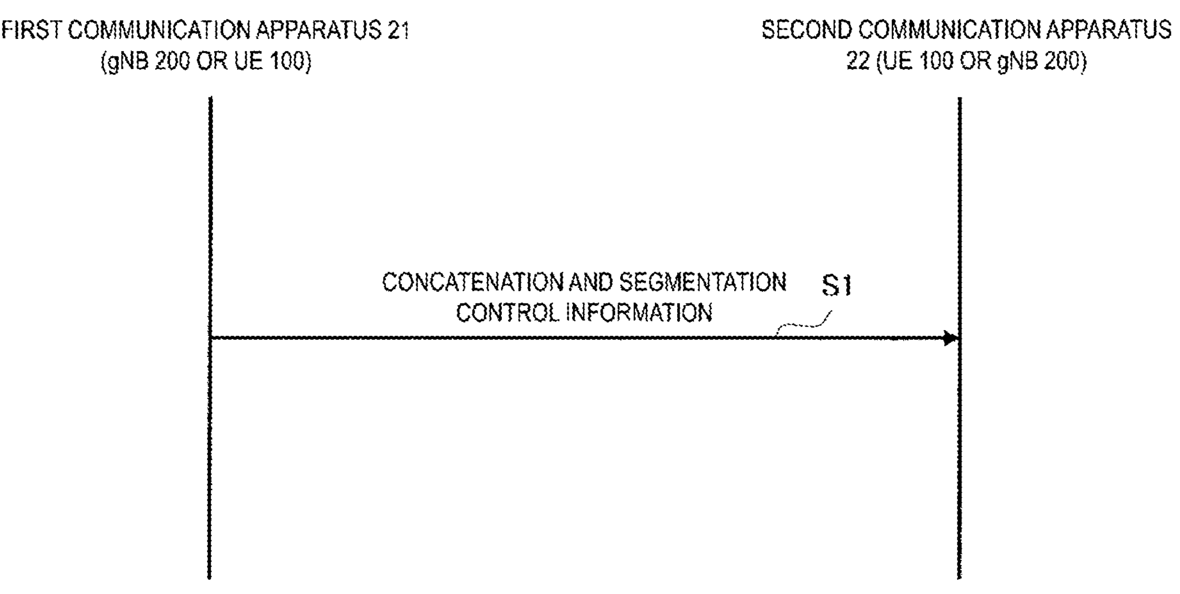
FIG. 10 is a diagram illustrating transmission and reception of control information according to an embodiment.

FIG. 10 is a diagram illustrating transmission and reception of control information according to an embodiment. A first communication apparatus 21 including one PDCP entity out of the pair of PDCP entities transmits control information to a second communication apparatus 22 including the other PDCP entity out of the pair of PDCP entities (Step S1). The control information is used for control of the PDCP concatenation processing and/or the PDCP segmentation processing. Here, the first communication apparatus 21 is the gNB 200 or the UE 100, and the second communication apparatus 22 is the gNB 200 or the UE 100. In this manner, by transmitting and receiving the control information (hereinafter referred to as "concatenation and segmentation control information") used for control of the PDCP concatenation processing and/or the PDCP segmentation processing, appropriate control of the PDCP concatenation processing and the PDCP segmentation processing can be performed.

In Step S1, the transmission-side PDCP entity 50T or the reception-side PDCP entity 50R of the first communication apparatus 21 may transmit a PDCP Control PDU including the concatenation and segmentation control information to the second communication apparatus 22. The PDCP PDU includes a PDCP Data PDU used for transmission of user data and a PDCP Control PDU used for control. The PDCP concatenation processing and the PDCP segmentation processing are applied to the PDCP Data PDU. Note that the PDCP entity is established for each bearer (data bearer). By transmitting the concatenation and segmentation control information on the PDCP Control PDU, the PDCP concatenation processing and the PDCP segmentation processing can be appropriately controlled for each bearer.

In Step S1, the RRC entity of the first communication apparatus 21 may transmit an RRC message including the concatenation and segmentation control information to the second communication apparatus 22. For example, the RRC message transmitted from the gNB 200 to the UE 100 may be an RRC Reconfiguration message being a UE-dedicated RRC message. The RRC message transmitted from the UE 100 to the gNB 200 may be a UE Assistance Information message and/or a UE Capability Information message. The RRC message including the concatenation and segmentation control information may further include a bearer identifier associated with the concatenation and segmentation control information. Thus, the PDCP concatenation processing and the PDCP segmentation processing can be appropriately controlled for each bearer.

Alternatively, the concatenation and segmentation control information may be included in a MAC control element (MAC CE) transmitted and received in the MAC layer. The concatenation and segmentation control information may be included in Downlink Control Information (DCI) or Uplink Control Information (UCI) transmitted and received in the PHY layer. The concatenation and segmentation control information may be included in a PDCP Control PDU. The concatenation and segmentation control information may be included in an RLC Control PDU.

The first communication apparatus 21 may include the transmission-side PDCP entity 50T, and the second communication apparatus 22 may include the reception-side PDCP entity 50R. In Step S1, the transmission-side PDCP entity 50T of the first communication apparatus 21 may transmit the PDCP PDU including the concatenation and segmentation control information in the PDCP header to the reception-side PDCP entity 50R of the second communication apparatus 22. Thus, the PDCP concatenation processing and the PDCP segmentation processing can be appropriately controlled for each PDCP PDU.

As described above, the transmission-side PDCP entity 50T may insert the partition codes between the PDCP SDUs constituting the concatenated SDU, and thereby generate the PDCP PDU. By inserting such partition codes, the reception-side PDCP entity 50R can easily perform the PDCP segmentation processing. The concatenation and segmentation control information may include information for specifying the partition codes. Thus, any bit string can be specified as the partition codes. The partition codes can be changed as necessary.

In an embodiment, the concatenation and segmentation control information may include information indicating the size of each PDCP SDU constituting the concatenated SDU. Thus, the reception-side PDCP entity 50R can easily perform the PDCP segmentation processing. When such concatenation and segmentation control information is transmitted and received, insertion of the partition codes may be unnecessary.

For example, when the first communication apparatus 21 is the gNB 200 including the reception-side PDCP entity 50R and the second communication apparatus 22 is the UE 100 including the transmission-side PDCP entity 50T, the concatenation and segmentation control information may include configuration information for configuring the UE 100 with the size of each PDCP SDU that can be concatenated through the PDCP concatenation processing in the uplink. The concatenation and segmentation control information may further include information for configuring the UE 100 with the maximum size of the concatenated SDU or the maximum size of the PDCP PDU generated using the PDCP concatenation processing in the uplink.

Alternatively, when the first communication apparatus 21 includes the transmission-side PDCP entity 50T and the second communication apparatus 22 includes the reception-side PDCP entity 50R, the transmission-side PDCP entity 50T of the first communication apparatus 21 may add the PDCP header including information indicating the size of each PDCP SDU constituting the concatenated SDU as the concatenation and segmentation control information to the concatenated SDU, and thereby generate the PDCP PDU.

In an embodiment, the concatenation and segmentation control information may include information for initiating the PDCP concatenation processing or the PDCP segmentation processing or information for ending the PDCP concatenation processing or the PDCP segmentation processing. Thus, the PDCP concatenation processing and the PDCP segmentation processing can be turned on/off (activated/deactivated), depending on a situation. For example, such control is enabled that the PDCP concatenation processing and the PDCP segmentation processing are temporarily turned off during a period of time in which packet segmentation processing (RLC segmentation) is executed in the RLC layer.

For example, when the first communication apparatus 21 is the gNB 200 including the transmission-side PDCP entity 50T and the second communication apparatus 22 is the UE 100 including the reception-side PDCP entity 50R, the concatenation and segmentation control information may include information for configuring the UE 100 with the PDCP segmentation processing in the downlink. For example, the concatenation and segmentation control information may include information for activating the PDCP segmentation processing in the downlink.

When the first communication apparatus 21 is the gNB 200 including the transmission-side PDCP entity 50T and the second communication apparatus 22 is the UE 100 including the reception-side PDCP entity 50R, the concatenation and segmentation control information may include information for releasing configuration of the PDCP segmentation processing in the downlink. The concatenation and segmentation control information may include information for deactivating the PDCP segmentation processing in the downlink.

When the first communication apparatus 21 is the gNB 200 including the reception-side PDCP entity 50R and the second communication apparatus 22 is the UE 100 including the transmission-side PDCP entity 50T, the concatenation and segmentation control information may include information for configuring the UE 100 with the PDCP concatenation processing in the uplink. The concatenation and segmentation control information may include information for activating the PDCP concatenation processing in the uplink.

When the first communication apparatus 21 is the gNB 200 including the reception-side PDCP entity 50R and the second communication apparatus 22 is the UE 100 including the transmission-side PDCP entity 50T, the concatenation and segmentation control information may include information for releasing configuration of the PDCP concatenation processing in the uplink. The concatenation and segmentation control information may include information for deactivating the PDCP concatenation processing in the uplink.

When the first communication apparatus 21 is the UE 100 including the transmission-side PDCP entity 50T and the second communication apparatus 22 is the gNB 200 including the reception-side PDCP entity 50R, and the UE 100 determines to activate or deactivate the PDCP concatenation processing in the uplink, the concatenation and segmentation control information may include information indicating details of the determination.

EXAMPLES

Based on an assumption of the embodiment described above, a first example to a sixth example will be described. These examples can not only be separately and independently implemented, but can also be implemented in combination of two or more thereof. In an operation flow of each example described below, all the steps may not be necessarily performed, and only a part of the steps may be performed.

(1) First Example

Figure 11:
FIG. 11 is a diagram illustrating partition codes according to a first example.
Figure 11:
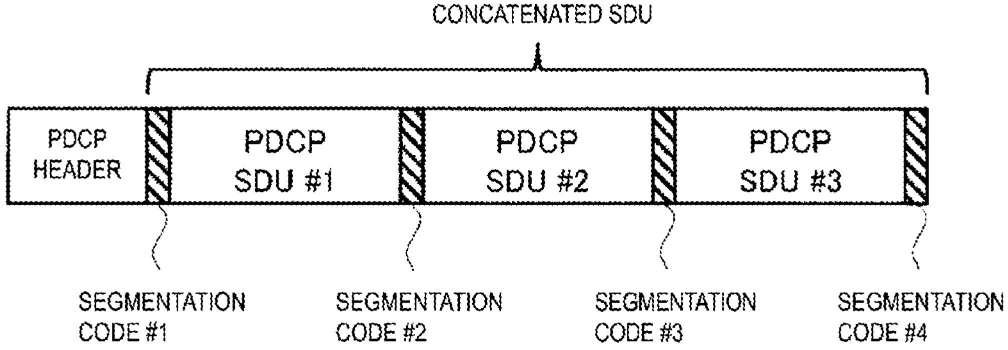

A first example is an example related to the partition codes described above. FIG. 11 is a diagram illustrating the partition codes according to the first example.

In the example illustrated in FIG. 11, the transmission-side PDCP entity 50T performs the PDCP concatenation processing (PDCP Concatenation) of concatenating three PDCP SDUs (PDCP SDUs #1 to #3), and thereby generates the PDCP PDU including the concatenated SDU. In the first example, the transmission-side PDCP entity 50T inserts partition codes #2 and #3 between the concatenated PDCP SDUs. The transmission-side PDCP entity 50T may insert partition code #1 at the start of the concatenated SDU, in other words, at the start of a payload part of the PDCP PDU. The transmission-side PDCP entity 50T may insert partition code #4 at the end of the concatenated SDU, in other words, at the end of the payload part of the PDCP PDU. Note that partition code #1 at the start and partition code #4 at the end need not be present.

Each partition code may be any bit string recognized by the transmission-side PDCP entity 50T and the reception-side PDCP entity 50R in advance. For example, "0000 0000 0000 0000" may be used as the partition code. Note that such a bit length (16 bits) or a simple continuous sequence of "0"s may cause an accidental match with the bit string constituting the PDCP SDU, which may thus cause an erroneous determination in the reception-side PDCP entity 50R.

Each partition code may be a combination of any bit string and a checksum recognized by the transmission-side PDCP entity 50T and the reception-side PDCP entity 50R in advance. For example, of "0101 0011 1101 0101", the last 4 bits are a checksum part, and the rest is any bit string. 0101 ("5" in the decimal system)+0011 ("3" in the decimal system)+1101 ("13" in the decimal system)=10101 ("21" in the decimal system), and "0101", which is the 4 least significant bits of 10101 ("21" in the decimal system), is used as the checksum part. Such a checksum is a checksum of each single partition code. Alternatively, the checksum may be a checksum for the overall PDCP SDUs. For example, partition code #2 may be used as the checksum of PDCP SDU #1, partition code #3 may be used as the checksum of PDCP SDU #2, and partition code #4 may be used as the checksum of PDCP SDU #3. Alternatively, the checksum may be a checksum for the PDCP SDUs and the partition codes (a part thereof). In other words, the partition code includes a fixed bit string part and a checksum part. For example, partition code #2 (the checksum part of partition code #2) is used as the checksum of PDCP SDU #1 and partition code #2 (fixed bit string part). Partition code #3 (the checksum part of partition code #3) is used as the checksum of PDCP SDU #2 and partition code #3 (fixed bit string part). Partition code #4 (the checksum part of partition code #4) can be used as the checksum of PDCP SDU #3 and partition code #4 (fixed bit string part). Note that use of such a method of configuring the partition codes may still cause an accidental match with the bit string constituting the PDCP SDU.

The partition code may employ an escape expression (escape code) used in the Point-to-Point Protocol (PPP). Regarding the escape code, with octets of 0x00 to 0x1f and 0x40 to 0xff except 0x5e, the original value and a value XORed with 0x20 are transmitted subsequently to 0x7d. For example, when the partition code is fixed and is 0x11, 0x11 in transmission data is transmitted after being converted into 0x7d and 0x31. Thus, an end marker and the like may also be a fixed code. The reception side performs reverse operation of the above.

Figure 12:
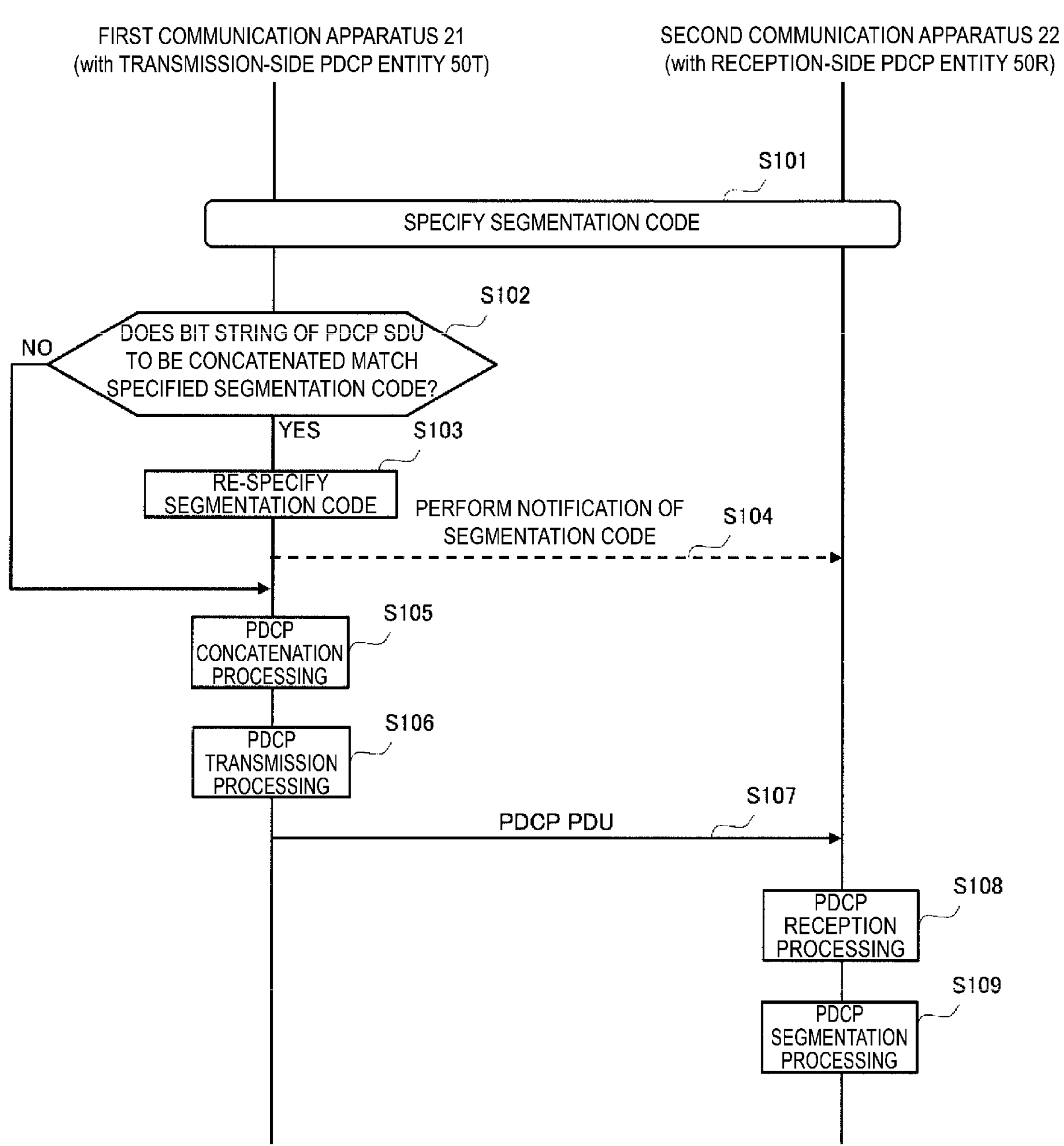
FIG. 12 is a diagram illustrating operation of the first example.

FIG. 12 is a diagram illustrating operation of the first example. In FIG. 12, the first communication apparatus 21 is the gNB 200 or the UE 100 including the transmission-side PDCP entity 50T. In FIG. 12, the second communication apparatus 22 is the gNB 200 or the UE 100 including the reception-side PDCP entity 50R.

In Step S101, the bit string of the partition code (and/or the end marker) is specified. The bit string of the partition code (and/or the end marker) may be a fixed value defined in a technical specification. The bit string of the partition code (and/or the end marker) may be specified for the UE 100 by the gNB 200. The bit string of the partition code (and/or the end marker) may be specified for the gNB 200 by the UE 100. The bit string of the partition code (and/or the end marker) may be specified for the reception-side PDCP entity 50R by the transmission-side PDCP entity 50T. The bit string of the partition code (and/or the end marker) may be specified for the transmission-side PDCP entity 50T by the reception-side PDCP entity 50R.

In Step S102, the transmission-side PDCP entity 50T determines whether a bit string matching the specified partition code is present in a plurality of concatenated PDCP SDUs. Specifically, first, the transmission-side PDCP entity 50T receives the plurality of concatenated PDCP SDUs from a higher layer. The transmission-side PDCP entity 50T may (individually) perform header compression processing on each of the PDCP SDUs at this time point. Next, the transmission-side PDCP entity 50T checks the bit string of the plurality of PDCP SDUs, and determines whether the bit string matches the specified partition code.

In a case of YES in Step S102 (in other words, when the bit string matches), in Step S103, the transmission-side PDCP entity 50T determines a bit string not included in the plurality of PDCP SDUs as a new partition code (in other words, the transmission-side PDCP entity 50T re-specifies a non-matching partition code). The transmission-side PDCP entity 50T may notify the reception-side PDCP entity 50R of the re-specified partition code, using the PDCP Control PDU, for example (Step S104). When the transmission-side PDCP entity 50T does not re-specify the partition code, the transmission-side PDCP entity 50T need not perform the notification, and only when the transmission-side PDCP entity 50T re-specifies the partition code, the transmission-side PDCP entity 50T may perform the notification. Alternatively, regardless of whether the transmission-side PDCP entity 50T has re-specified the partition code, the transmission-side PDCP entity 50T may notify the reception-side PDCP entity 50R of the partition code to be used in the PDCP PDU, using a header of the PDCP PDU (PDCP Data PDU).

In Step S105, the transmission-side PDCP entity 50T concatenates the PDCP SDUs, using the specified partition code (re-specified partition code). As described above, the transmission-side PDCP entity 50T generates the following concatenated SDU, for example: "Partition code+PDCP SDU #1+Partition code+PDCP SDU #2+Partition code".

In Step S106, the transmission-side PDCP entity 50T performs predetermined PDCP processing on the concatenated SDU, and generates the PDCP PDU. As the predetermined PDCP processing, for example, Integrity protection, Ciphering, and addition of a PDCP header are performed in the mentioned order. The transmission-side PDCP entity 50T may include information indicating the number of bits of the partition code in the PDCP header to be added to the concatenated SDU. The transmission-side PDCP entity 50T outputs the PDCP PDU to a lower layer (RLC).

In Step S107, the first communication apparatus 21 transmits the PDCP PDU to the second communication apparatus 22. The second communication apparatus 22 receives the PDCP PDU.

In Step S108, the reception-side PDCP entity 50R receives the PDCP PDU from the lower layer (RLC), and performs predetermined PDCP processing on the PDCP PDU. As the predetermined PDCP processing, Deciphering, Integrity verification, and Reordering/Duplication discarding are performed in the mentioned order. The predetermined PDCP processing includes processing of removing the PDCP header.

In Step S109, the reception-side PDCP entity 50R removes the partition code of the concatenated SDU, and extracts each of the concatenated PDCP SDUs. The reception-side PDCP entity 50R may perform header decompression processing on each of the extracted PDCP SDUs. Here, the reception-side PDCP entity 50R may recognize the bit string of the partition code, based on the first and/or last partition code. When the PDCP header includes the information of the number of bits of the partition code, the reception-side PDCP entity 50R may extract the number of bits from the following part of the PDCP header and/or the last part of the PDCP PDU, and thereby recognize the partition code. The reception-side PDCP entity 50R outputs each of the PDCP SDUs to a higher layer.

(2) Second Example

A second example is an example in which, instead of the partition codes described above, the size of the PDCP SDUs that can be concatenated is specified to thereby enable the PDCP segmentation processing. Here, description will be given based on an assumption of uplink communication, but the same and/or similar operation may be performed in downlink communication.

Figure 13:
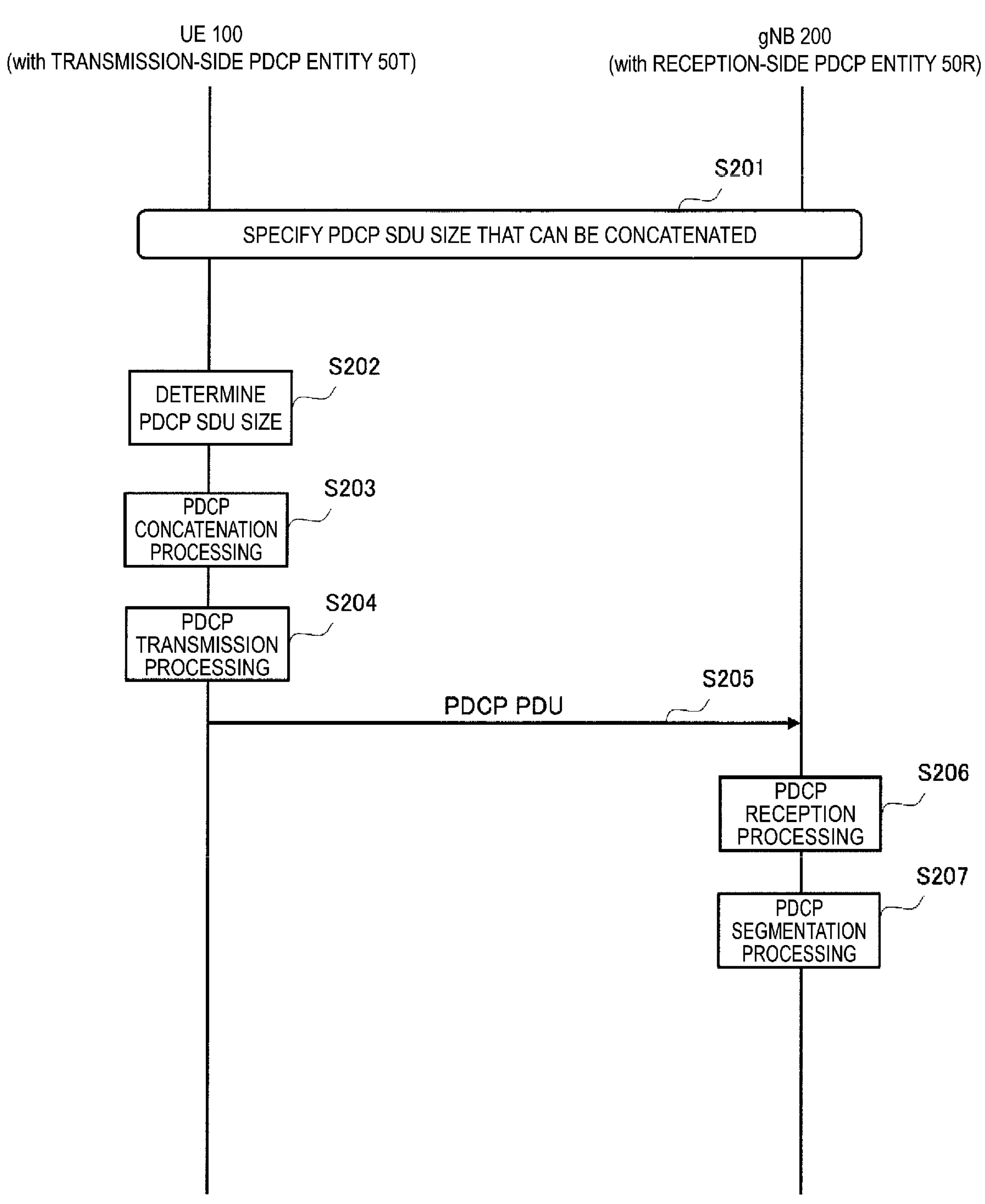
FIG. 13 is a diagram illustrating operation of a second example.

FIG. 13 is a diagram illustrating operation of the second example. The UE 100 includes the transmission-side PDCP entity 50T, and the gNB 200 includes the reception-side PDCP entity 50R.

In Step S201, the size of the PDCP SDUs that can be concatenated is specified. The PDCP SDU size may be a fixed value defined in a technical specification. The PDCP SDU size may be specified for the UE 100 by the gNB 200. The PDCP SDU size may be specified for the gNB 200 by the UE 100. The PDCP SDU size may be specified for the reception-side PDCP entity 50R by the transmission-side PDCP entity 50T. The PDCP SDU size may be specified for the transmission-side PDCP entity 50T by the reception-side PDCP entity 50R. Information indicating the PDCP SDU size may be included in an RRC message or a PDCP Control PDU. The information indicating the PDCP SDU size may be associated with a bearer identifier. In other words, the PDCP SDU size may be configured for each bearer.

Note that the size of the PDCP SDUs that can be concatenated may be a single value (for example, 1.5 kB or the like) and/or a range of values (1.0 kB to 1.5 kB or the like). When a range is used, the partition codes described above may be necessary.

Along with the size of the PDCP SDUs that can be concatenated, the maximum size of the concatenated SDU may be specified. The maximum size of the concatenated SDU may be a maximum size of the payload of the PDCP PDU.

In Step S202, the transmission-side PDCP entity 50T receives a PDCP SDU from a higher layer, and determines whether the size of the PDCP SDU matches the specified PDCP SDU size.

When the size of the PDCP SDU matches the specified PDCP SDU size, in Step S203, the transmission-side PDCP entity 50T performs the PDCP concatenation processing. When the transmission-side PDCP entity 50T performs the PDCP concatenation processing, the transmission-side PDCP entity 50T concatenates the PDCP SDU to a PDCP SDU that has been received immediately before. Here, when a total size of the size of the concatenated SDU and the size of the specified PDCP SDU size is equal to or greater than the maximum size of the concatenated SDU (in other words, when the transmission-side PDCP entity 50T cannot concatenate the PDCP SDU even if the transmission-side PDCP entity 50T receives the next PDCP SDU), the transmission-side PDCP entity 50T completes the PDCP concatenation processing. Then, the transmission-side PDCP entity 50T performs the predetermined PDCP processing, and delivers the PDCP PDU to a lower layer (Step S204).

In Step S202, when the size of the PDCP SDU does not match the specified PDCP SDU size, the transmission-side PDCP entity 50T may complete the PDCP concatenation processing without concatenating the PDCP SDU, and perform PDCP transmission processing. In this operation, in order to perform in-order delivery, when a PDCP SDU that cannot be concatenated is received, the PDCP PDU including the PDCP SDUs that have been concatenated before such reception is delivered to a lower layer.

Alternatively, in Step S202, when the size of the PDCP SDU does not match the specified PDCP SDU size, the transmission-side PDCP entity 50T may continue the PDCP concatenation processing without concatenating the PDCP SDU, and perform the PDCP concatenation processing for the next PDCP SDU. In this operation, with out-of-order delivery being permitted, processing efficiency is increased by increasing the size of one PDCP PDU at any rate.

In Step S202, when the PDCP SDU is smaller than the specified PDCP SDU size, the transmission-side PDCP entity 50T may add padding bits to the PDCP SDU to make the PDCP SDU match the specified PDCP SDU size, and then perform the PDCP concatenation processing.

In Step S205, the UE 100 transmits the PDCP PDU to the gNB 200. The gNB 200 receives the PDCP PDU.

In Step S206, the reception-side PDCP entity 50R of the gNB 200 performs PDCP reception processing.

In Step S207, the reception-side PDCP entity 50R performs the PDCP segmentation processing. For example, the reception-side PDCP entity 50R removes the PDCP header, and then segments the payload part (concatenated SDU) by the specified PDCP SDU size, and extracts a plurality of PDCP SDUs. Then, the reception-side PDCP entity 50R outputs the plurality of PDCP SDUs to a higher layer. Here, the reception-side PDCP entity 50R may output the plurality of PDCP SDUs to the higher layer in the order that the plurality of PDCP SDUs are concatenated in the payload part (in other words, in-order delivery).

Note that the gNB 200 may configure the UE 100 to perform the PDCP concatenation processing in order (in-order). Such configuration may be notified from the reception-side PDCP entity 50R to the transmission-side PDCP entity 50T. Such configuration may be notified from the transmission-side PDCP entity 50T to the reception-side PDCP entity 50R.

(3) Third Example

A third example is an example in which the size of each PDCP SDU constituting the concatenated SDU included in the PDCP PDU is notified using the PDCP header of the PDCP PDU.

Figure 14:
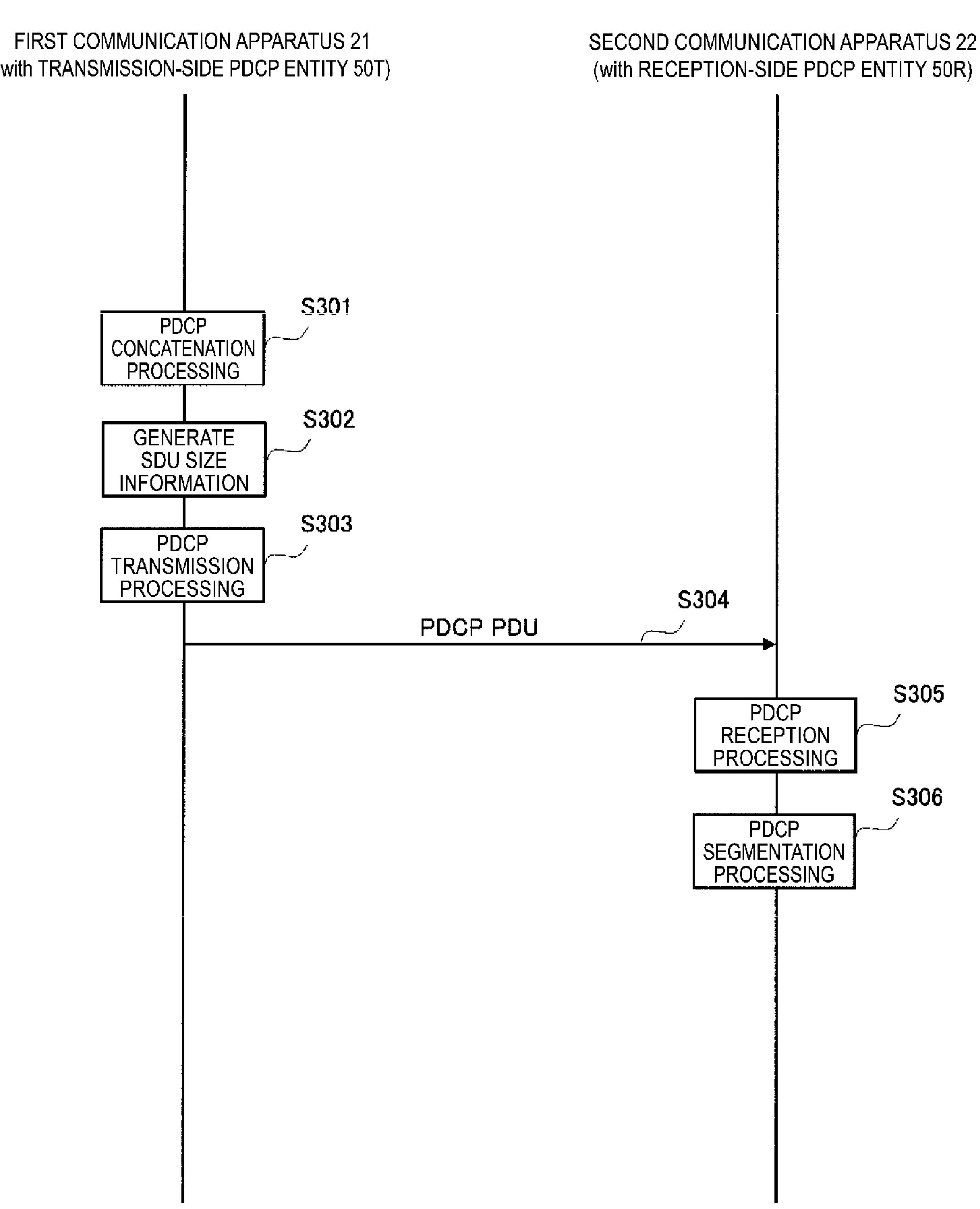
FIG. 14 is a diagram illustrating operation of a third example.

FIG. 14 is a diagram illustrating operation of the third example. In FIG. 14, the first communication apparatus 21 is the gNB 200 or the UE 100 including the transmission-side PDCP entity 50T, and the second communication apparatus 22 is the gNB 200 or the UE 100 including the reception-side PDCP entity 50R.

In Step S301, the transmission-side PDCP entity 50T performs the PDCP concatenation processing. Here, the transmission-side PDCP entity 50T may store the size of each of the concatenated PDCP SDUs.

In Step S302, the transmission-side PDCP entity 50T generates SDU size information indicating the size of each of the concatenated PDCP SDUs. The SDU size information is mapped to the PDCP header.

When the concatenated PDCP SDUs have the same size, the SDU size information may only include information of one size. In order to make the concatenated PDCP SDUs have the same size, the transmission-side PDCP entity 50T may add padding bits to a PDCP SDU smaller than the size and then concatenate the PDCP SDU.

On the other hand, when the concatenated PDCP SDUs have sizes different from one another, the SDU size information may include information of the size of each of the PDCP SDUs. In this case, order of pieces of information of the sizes in the header and order of the PDCP SDUs in the payload may match. Thus, the reception-side PDCP entity 50R can identify correspondence between the pieces of the size information and their corresponding PDCP SDUs according to the mapping order.

In Step S303, the transmission-side PDCP entity 50T adds the PDCP header including the SDU size information generated in Step S302 to the concatenated SDU, and performs the PDCP transmission processing. The transmission-side PDCP entity 50T may include, in the PDCP header, information indicating that the PDCP concatenation processing is performed on the PDCP PDU. The transmission-side PDCP entity 50T may include, in the PDCP header, information indicating the number of PDCP SDUs constituting the concatenated SDU.

In Step S304, the first communication apparatus 21 transmits the PDCP PDU to the second communication apparatus 22. The second communication apparatus 22 receives the PDCP PDU.

In Step S305, the reception-side PDCP entity 50R receives the PDCP PDU from a lower layer, and performs the PDCP reception processing.

In Step S306, the reception-side PDCP entity 50R performs the PDCP segmentation processing, based on the SDU size information included in the header of the PDCP PDU. Specifically, the reception-side PDCP entity 50R acquires the SDU size information from the header of the PDCP PDU, removes the header, and then segments the payload part, based on the SDU size information. Then, the reception-side PDCP entity 50R outputs each of the PDCP SDUs obtained after the segmentation to a higher layer.

Figure 15:
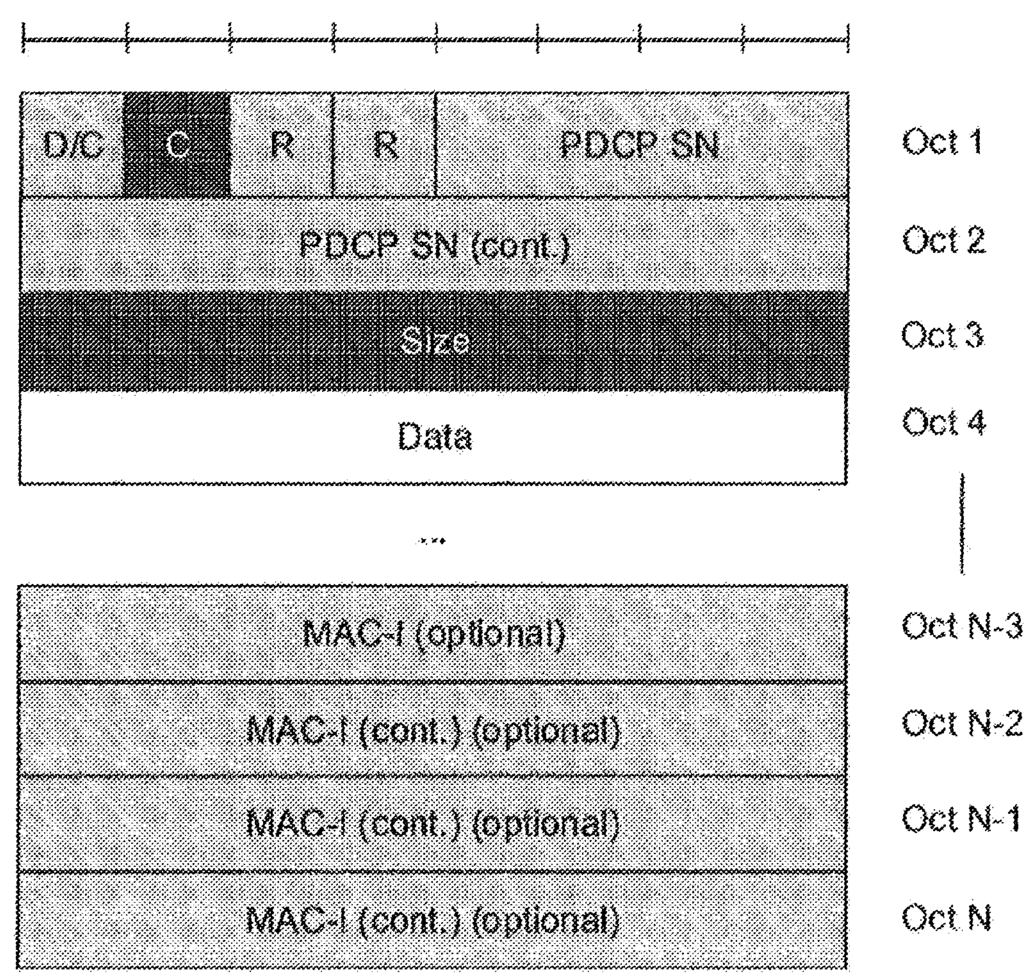
FIG. 15 is a diagram illustrating a first configuration example of the PDCP PDU according to the third example.

FIG. 15 is a diagram illustrating a first configuration example of the PDCP PDU according to the third example. The first configuration example may be applied when the sizes of the PDCP SDUs constituting the concatenated SDU are the same.

In FIG. 15, a "C" field indicates that, when a value to be set is "1", it is the PDCP PDU subjected to the PDCP concatenation processing. In this case, a "Size" field is inserted. The "Size" field indicates the size of the PDCP SDU. A value to be set to the "Size" field may be an index indicating the size of the PDCP SDU. The index refers to a table of the PDCP SDU size. For example, the following association is defined: "0000 0000": 100 bytes, "0000 0001": 200 bytes, . . . , "1111 1111": 1500 bytes. The "Size" field may be present prior to "Data" (stored in the PDCP header), or may be present at the end of the PDCP PDU (in other words, the "Size" field may be present subsequent to "MAC-I").

Figure 16:
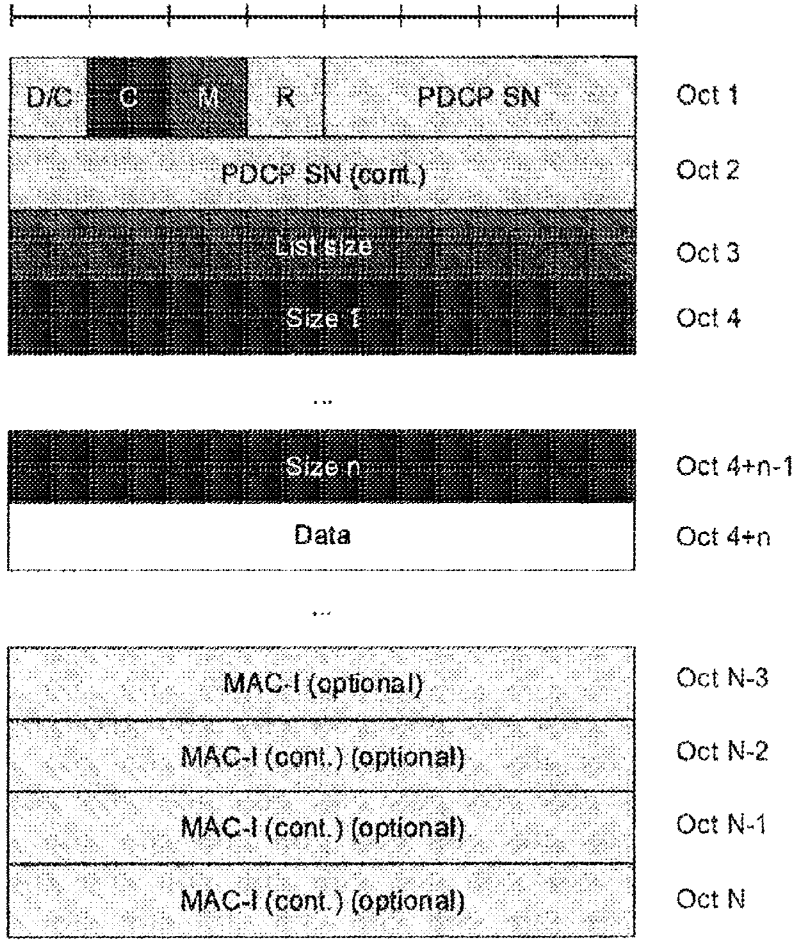
FIG. 16 is a diagram illustrating a second configuration example of the PDCP PDU according to the third example.

FIG. 16 is a diagram illustrating a second configuration example of the PDCP PDU according to the third example. The second configuration example may be applied when the sizes of the PDCP SDUs constituting the concatenated SDU are at least partially different.

In FIG. 16, the "C" field is the same as and/or similar to that of the first configuration example described above. An "M" field indicates that, when a value to be set is "1", each size of the PDCP SDU is notified. A "List size" field indicates the number of "Size"s (or the number of PDCP SDUs). A value set to the "List size" field may be an index indicating the number. The index refers to a table of the number. For example, the following association is defined: "0000 0000": 2, "0000 0001": 3, . . . , "1111 1111": n. The "Size" field is the same as and/or similar to that of the first configuration example described above. The "List size" field and/or the "Size" field may be present prior to "Data" (stored in the PDCP header), or may be present at the end of the PDCP PDU (in other words, the "List size" field and/or the "Size" field may be present subsequent to "MAC-I").

(4) Fourth Example

Figure 17:
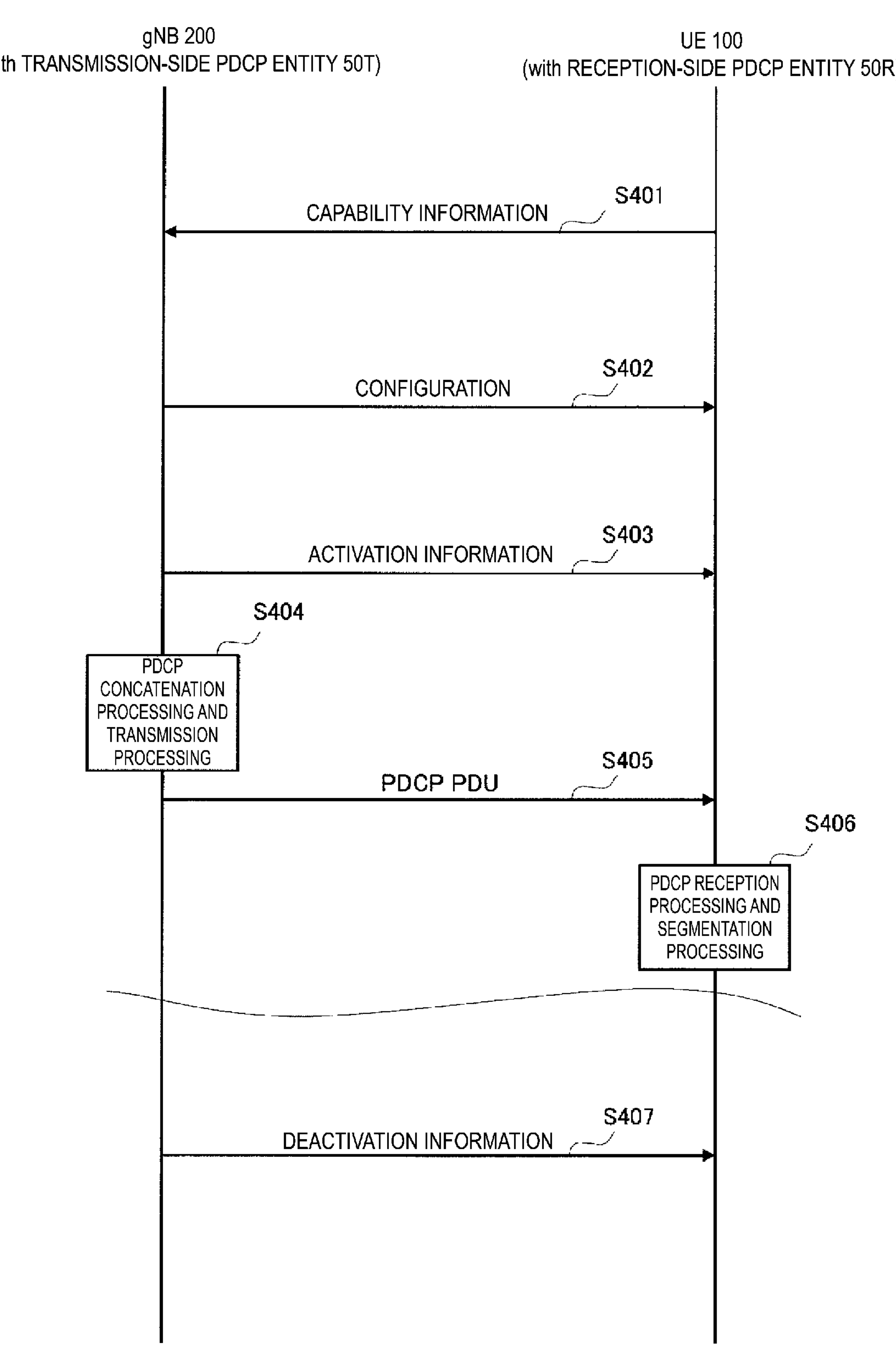
FIG. 17 is a diagram illustrating operation of a fourth example.

A fourth example is an example for the gNB 200 to control the PDCP concatenation and segmentation processing in the downlink FIG. 17 is a diagram illustrating operation of the fourth example. The gNB 200 includes the transmission-side PDCP entity 50T, and the UE 100 includes the reception-side PDCP entity 50R.

In Step S401, the UE 100 transmits capability information (for example, a UE Capability Information message) indicating support of downlink PDCP segmentation processing to the gNB 200. Such information may be information indicating permission of downlink PDCP concatenation processing. The gNB 200 may determine to perform the downlink PDCP concatenation processing, based on the information.

In Step S402, for example, the gNB 200 performs configuration related to the downlink PDCP segmentation processing, using an RRC message or a PDCP Control PDU to be transmitted to the UE 100. Such configuration includes at least one selected from the group consisting of the size (or a range of the size) of each of the concatenated PDCP SDUs, the maximum size of the PDCP PDU or its payload part (the maximum size of the concatenated SDU), and a bearer ID of a bearer for performing the PDCP concatenation and segmentation processing.

In Step S403, for example, the gNB 200 transmits, to the UE 100, indication information for indicating activation of the downlink PDCP segmentation processing, using an RRC message or a PDCP Control PDU to be transmitted to the UE 100. Such indication information may be information for indicating initiation of the downlink PDCP concatenation processing. The indication information may include a bearer ID of a target bearer. Note that Step S403 is not necessarily required, and the configuration of Step S402 may include activation (standby indication). In other words, the gNB 200 may force the UE 100 to stand by through the configuration of Step S402 without performing the standby indication. In this case, the configuration information of Step S402 may include an information element indicating the activation. When the configuration is performed, the UE 100 may recognize a possibility of receiving the PDCP PDU subjected to the PDCP concatenation processing.

Note that, in response to a fact that radio resources of its cell are not congested and/or a fact that a radio environment between the UE 100 and the gNB 200 is satisfactory, the gNB 200 may determine to initiate the PDCP concatenation and segmentation processing. The radio environment can be recognized based on a measurement report from the UE 100 and/or gNB measurement of UL signals from the UE 100, for example, and RSRP, RSRQ, and SINR correspond to the radio environment, for example.

In Step S404, the transmission-side PDCP entity 50T of the gNB 200 performs the downlink PDCP concatenation processing and PDCP transmission processing.

In Step S405, the gNB 200 transmits the PDCP PDU to the UE 100. The UE 100 receives the PDCP PDU.

In Step S406, the reception-side PDCP entity 50R of the UE 100 performs the downlink PDCP reception processing and PDCP segmentation processing, and thereby outputs each PDCP SDU to a higher layer.

Subsequently, in Step S407, for example, the gNB 200 may transmit, to the UE 100, indication information for indicating deactivation of the downlink PDCP segmentation processing, using an RRC message or a PDCP Control PDU to be transmitted to the UE 100. The indication information may include a bearer ID of a target bearer. Such indication information may be release indication information for releasing the configuration of Step S402. In response to reception of such indication information, the UE 100 stops (ends) the downlink PDCP segmentation processing.

Note that, in response to a fact that radio resources of its cell are congested and/or a fact that the radio environment between the UE 100 and the gNB 200 is poor, the gNB 200 may determine to end the PDCP concatenation and segmentation processing.

(5) Fifth Example

Figure 18:
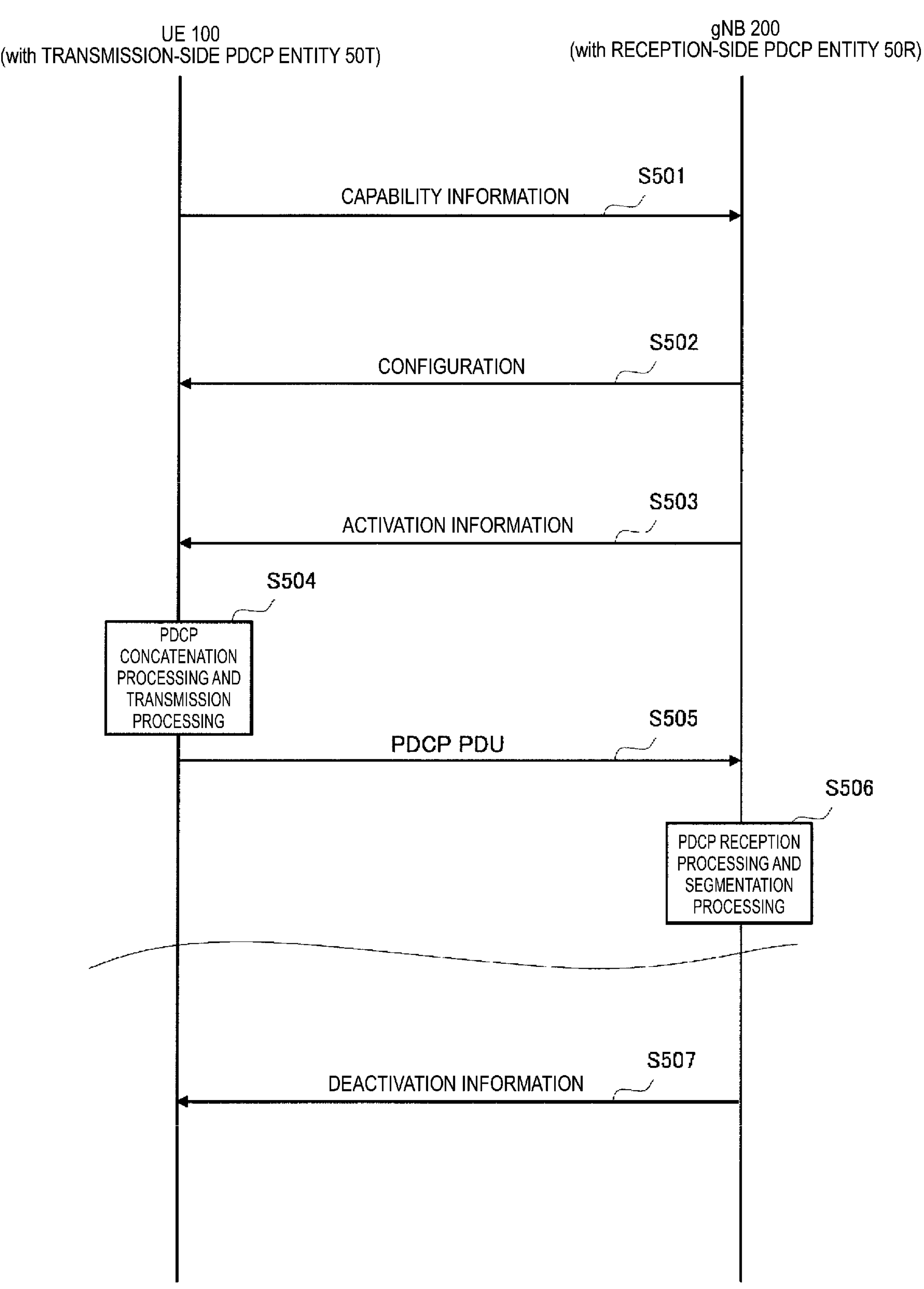
FIG. 18 is a diagram illustrating operation of a fifth example.

A fifth example is an example for the gNB 200 to control the PDCP concatenation and segmentation processing in the uplink FIG. 18 is a diagram illustrating operation of the fifth example. The UE 100 includes the transmission-side PDCP entity 50T, and the gNB 200 includes the reception-side PDCP entity 50R.

In Step S501, the UE 100 transmits capability information (for example, a UE Capability Information message) indicating support of uplink PDCP concatenation processing to the gNB 200. The gNB 200 may determine to cause the UE 100 to execute the uplink PDCP concatenation processing, based on the information.

In Step S502, for example, the gNB 200 performs configuration related to the uplink PDCP concatenation processing, using an RRC message or a PDCP Control PDU to be transmitted to the UE 100. Such configuration includes at least one selected from the group consisting of the size (or a range of the size) of each of the concatenated PDCP SDUs, the maximum size of the PDCP PDU or its payload part (the maximum size of the concatenated SDU), and a bearer ID of a bearer for performing the PDCP concatenation and segmentation processing.

In Step S503, for example, the gNB 200 transmits, to the UE 100, indication information for indicating activation of the uplink PDCP concatenation processing, using an RRC message or a PDCP Control PDU to be transmitted to the UE 100. The indication information may include a bearer ID of a target bearer. Note that Step S503 is not necessarily required, and the configuration of Step S502 may include activation (standby indication). In other words, the gNB 200 may force the UE 100 to initiate the PDCP concatenation processing through the configuration of Step S502 without performing the standby indication. In this case, the configuration information of Step S502 may include an information element indicating the activation. When the configuration is performed, the UE 100 may recognize a possibility of receiving the PDCP PDU subjected to the PDCP concatenation processing.

Note that, in response to a fact that radio resources of its cell are not congested and/or a fact that a radio environment between the UE 100 and the gNB 200 is satisfactory, the gNB 200 may determine to initiate the PDCP concatenation and segmentation processing.

In Step S504, the transmission-side PDCP entity 50T of the UE 100 performs the uplink PDCP concatenation processing and PDCP transmission processing.

In Step S505, the UE 100 transmits the PDCP PDU to the gNB 200. The gNB 200 receives the PDCP PDU.

In Step S506, the reception-side PDCP entity 50R of the gNB 200 performs the uplink PDCP reception processing and PDCP segmentation processing, and thereby outputs each PDCP SDU to a higher layer.

Subsequently, in Step S507, for example, the gNB 200 may transmit, to the UE 100, indication information for indicating deactivation of the uplink PDCP concatenation processing, using an RRC message or a PDCP Control PDU to be transmitted to the UE 100. The indication information may include a bearer ID of a target bearer. Such indication information may be release indication information for releasing the configuration of Step S502. In response to reception of such indication information, the UE 100 stops (ends) the uplink PDCP concatenation processing.

Note that, in response to a fact that radio resources of its cell are congested and/or a fact that the radio environment between the UE 100 and the gNB 200 is poor, the gNB 200 may determine to end the PDCP concatenation and segmentation processing.

(6) Sixth Example

Figure 19:
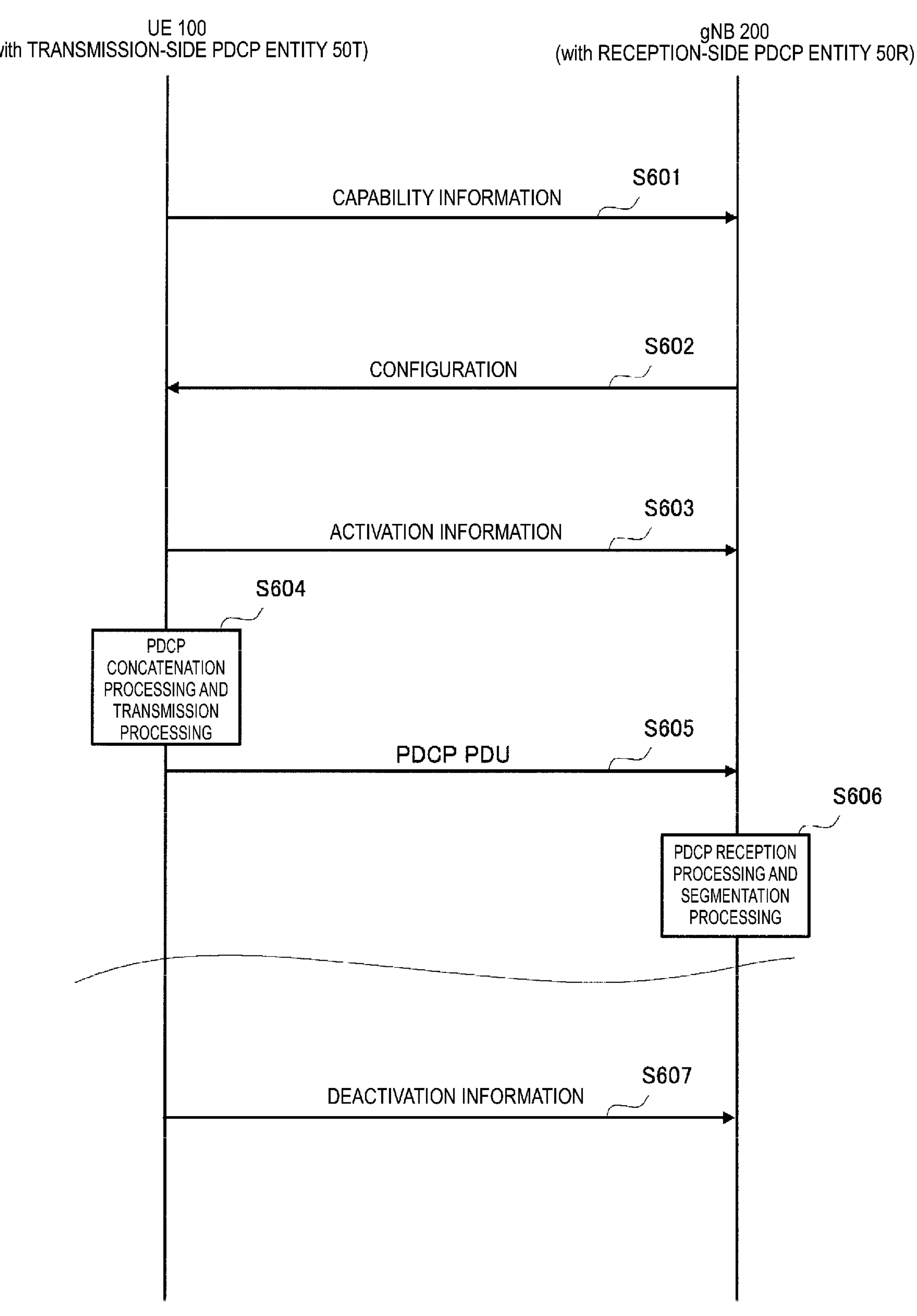
FIG. 19 is a diagram illustrating operation of a sixth example.

A sixth example is an example for the UE to initiate activation and deactivation of the PDCP concatenation and segmentation processing in the uplink FIG. 19 is a diagram illustrating operation of the sixth example. The UE 100 includes the transmission-side PDCP entity 50T, and the gNB 200 includes the reception-side PDCP entity 50R.

In FIG. 19, the processes of Steps S601, S602, S604, S605, and S606 are the same as and/or similar to Steps S501, S502, S504, S505, and S506 described above, respectively, and thus Steps S603 and S607 will be described.

In Step S603, the UE 100 determines to turn on (activate) the uplink PDCP concatenation processing in accordance with a predetermined condition, and transmits activation information to the gNB 200. The predetermined condition may be a condition that the radio environment is satisfactory, for example. The predetermined condition may be a condition that RLC segmentation does not frequently occur, for example. Such condition determination may be determination through comparison with a threshold. The threshold may be configured from the gNB 200 to the UE 100. The activation information may be transmitted using an RRC message or a PDCP Control PDU. The activation information may include a bearer ID of a target bearer.

In Step S607, the UE 100 determines to turn off (deactivate) the uplink PDCP concatenation processing in accordance with a predetermined condition, and transmits deactivation information to the gNB 200. The predetermined condition may be a condition that the radio environment is poor, for example. The predetermined condition may be a condition that RLC segmentation frequently occurs, for example. Such condition determination may be determination through comparison with a threshold. The threshold may be configured from the gNB 200 to the UE 100. The deactivation information may be transmitted using an RRC message or a PDCP Control PDU. The deactivation information may include a bearer ID of a target bearer.

The sixth example describes an example in which the UE initiates activation and deactivation of the PDCP concatenation and segmentation processing in the uplink. However, the following variation is also possible in which the UE 100 initiates activation and deactivation of the PDCP concatenation processing of the gNB 200 in the downlink. For example, the UE 100 having such a capability may transmit capability information (for example, a UE Capability Information message) indicating that the UE 100 has the capability to the gNB 200. In such a variation, the "uplink PDCP concatenation processing" in description of Steps S603 and S607 described above is replaced with the "downlink PDCP concatenation processing".

Other Embodiments

In the embodiments and examples described above, the UE 100 in the RRC idle state or the RRC inactive state may receive the PDCP PDU transmitted from the gNB 200 through broadcast or multicast. Such a PDCP PDU may be a type of Multicast Broadcast Service (MBS) data. The gNB 200 may apply the PDCP concatenation processing described above to such a PDCP PDU. The UE 100 may apply the PDCP concatenation processing described above to such a PDCP PDU. The concatenation and segmentation control information transmitted from the gNB 200 to the UE 100 may be information included in a system information message (System Information Block (SIB)) being an RRC message transmitted by the gNB 200 through broadcast.

The embodiments and examples described above mainly describe a case in which the PDCP concatenation processing and the PDCP segmentation processing are applied to the downlink, the uplink, and the sidelink. However, the PDCP concatenation processing and the PDCP segmentation processing may be applied to a link via a Wireless Local Area Network (WLAN). For example, application may be possible to such a protocol stack that an adaptation layer is deployed in a lower layer of the PDCP layer, and a MAC layer and a PHY layer of the WLAN are deployed in lower layers of the adaptation layer.

The operation flows described above can be separately and independently implemented, and also be implemented in combination of two or more of the operation flows. For example, some steps of one operation flow may be added to another operation flow or some steps of one operation flow may be replaced with some steps of another operation flow.

In the embodiments and examples described above, an example in which the base station is an NR base station (i.e., a gNB) is described; however, the base station may be an LTE base station (i.e., an eNB) or a 6G base station. The base station may be a relay node such as an Integrated Access and Backhaul (IAB) node. The base station may be a Distributed Unit (DU) of the IAB node. The user equipment may be a Mobile Termination (MT) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing processing performed by the UE 100 or the gNB 200 may be integrated, and at least a part of the UE 100 or the gNB 200 may be implemented as a semiconductor integrated circuit (chipset, system on a chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Embodiments have been described above in detail with reference to the drawings, but specific configurations are not limited to those described above, and various design variation can be made without departing from the gist of the present disclosure.

REFERENCE SIGNS

1: Mobile communication system
21: First communication apparatus
22: Second communication apparatus
50R: Reception-side PDCP entity
50T: Transmission-side PDCP entity
100: UE
110: Receiver
120: Transmitter
130: Controller
200: gNB
210: Transmitter
220: Receiver
230: Controller
240: Backhaul communicator

The invention claimed is:

1. A communication method used in a mobile communication system comprising a pair of Packet Data Convergence Protocol (PDCP) entities comprising a transmission-side PDCP entity for transmitting a PDCP Protocol Data Unit (PDU) and a reception-side PDCP entity for receiving the PDCP PDU, the communication method comprising the steps of:

performing, by a transmission-side PDCP entity, PDCP concatenation processing of concatenating a plurality of PDCP Service Data Units (SDUs) and thereby generating a PDCP PDU comprising a concatenated SDU;

performing, by a reception-side PDCP entity, PDCP segmentation processing of segmenting the concatenated SDU comprised in the PDCP PDU into the plurality of PDCP SDUS; and transmitting control information used for control of the PDCP concatenation processing and/or the PDCP segmentation processing from a first communication apparatus comprising one of a pair of PDCP entities to a second communication apparatus comprising the other of the pair of PDCP entities, wherein the generating of the PDCP PDU comprises inserting a partition code between each of the plurality of PDCP SDUs constituting the concatenated SDU.

2. The communication method according to claim 1, wherein the transmitting comprises transmitting, by the transmission-side PDCP entity or the reception-side PDCP entity, a PDCP Control PDU comprising the control information.

3. The communication method according to claim 1, wherein the transmitting comprises transmitting an RRC message comprising the control information.

4. The communication method according to claim 3, wherein the transmitting comprises transmitting the RRC message further comprising a bearer identifier associated with the control information.

5. The communication method according to claim 1, wherein the first communication apparatus comprises the transmission-side PDCP entity, the second communication apparatus comprises the reception-side PDCP entity, and the transmitting comprises transmitting, by the transmission-side PDCP entity, the PDCP PDU comprising the control information in a PDCP header.

6. The communication method according to claim 1, wherein the control information comprises information for specifying the partition code.

7. The communication method according to claim 1, wherein the generating of the PDCP PDU comprises determining, when a bit string matching a specified partition code is present in the plurality of PDCP SDUs, a bit string not comprised in the plurality of PDCP SDUs as a new partition code.

8. The communication method according to claim 1, wherein the control information comprises information indicating a size of each of the plurality of PDCP SDUS constituting the concatenated SDU.

9. The communication method according to claim 8, wherein the first communication apparatus is a network node comprising the reception-side PDCP entity, the second communication apparatus is a user equipment comprising the transmission-side PDCP entity, and the control information comprises configuration information for configuring the user equipment with the size of each of the plurality of PDCP SDUs that can be concatenated through the PDCP concatenation processing in an uplink.

10. The communication method according to claim 9, wherein the control information further comprises information for configuring the user equipment with a maximum size of the concatenated SDU or a maximum size of the PDCP PDU generated using the PDCP concatenation processing in the uplink, and wherein the maximum size is a threshold related to a size of the PDCP PDU or a size of a payload of the PDCP PDU.

11. The communication method according to claim 8, wherein the first communication apparatus comprises the transmission-side PDCP entity, the second communication apparatus comprises the reception-side PDCP entity, and the generating of the PDCP PDU comprises adding, to the concatenated SDU, the PDCP header comprising the information indicating the size of each of the plurality of PDCP SDUS constituting the concatenated SDU.

12. The communication method according to claim 1, wherein the control information comprises information for initiating the PDCP concatenation processing or the PDCP segmentation processing, or information for ending the PDCP concatenation processing or the PDCP segmentation processing.

13. The communication method according to claim 12, wherein the first communication apparatus is a network node comprising the transmission-side PDCP entity, the second communication apparatus is a user equipment comprising the reception-side PDCP entity, and the control information comprises information for configuring the user equipment with the PDCP segmentation processing in a downlink or information for activating the PDCP segmentation processing in the downlink.

14. The communication method according to claim 12, wherein the first communication apparatus is a network node comprising the transmission-side PDCP entity, the second communication apparatus is a user equipment comprising the reception-side PDCP entity, and the control information comprises information for releasing configuration of the PDCP segmentation processing in a downlink or information for deactivating the PDCP segmentation processing in the downlink.

15. The communication method according to claim 12, wherein the first communication apparatus is a network node comprising the reception-side PDCP entity, the second communication apparatus is a user equipment comprising the transmission-side PDCP entity, and the control information comprises information for configuring the user equipment with the PDCP concatenation processing in an uplink or information for activating the PDCP concatenation processing in the uplink.

16. The communication method according to claim 12, wherein the first communication apparatus is a network node comprising the reception-side PDCP entity, the second communication apparatus is a user equipment comprising the transmission-side PDCP entity, and the control information comprises information for releasing configuration of the PDCP concatenation processing in an uplink or information for deactivating the PDCP concatenation processing in the uplink.

17. The communication method according to claim 12, wherein the first communication apparatus is a user equipment comprising the transmission-side PDCP entity, and the second communication apparatus is a network node comprising the reception-side PDCP entity, and the control information comprises, when the user equipment determines to activate or deactivate the PDCP concatenation processing in an uplink, information indicating details of the determination.

18. A communication apparatus used in a mobile communication system comprising a pair of Packet Data Convergence Protocol (PDCP) entities comprising a transmission-side PDCP entity for transmitting a PDCP Protocol Data Unit (PDU) and a reception-side PDCP entity for receiving the PDCP PDU, the communication apparatus comprising:

a controller comprising one of a transmission-side PDCP entity and a reception-side PDCP entity, wherein the transmission-side PDCP entity is configured to perform PDCP concatenation processing of concatenating a plurality of PDCP Service Data Units (SDUs) and thereby generate a PDCP PDU comprising a concatenated SDU by inserting a partition code between each of the plurality of PDCP SDUs constituting the concatenated SDU, the reception-side PDCP entity is configured to perform PDCP segmentation processing of segmenting the concatenated SDU comprised in the PDCP PDU into the plurality of PDCP SDUS, and the controller is configured to transmit control information used for control of the PDCP concatenation processing and/or the PDCP segmentation processing to another communication apparatus.

19. A chipset for a communication apparatus used in a mobile communication system comprising a pair of Packet Data Convergence Protocol (PDCP) entities comprising a transmission-side PDCP entity for transmitting a PDCP Protocol Data Unit (PDU) and a reception-side PDCP entity for receiving the PDCP PDU, the chipset configured to execute processing of:

performing, by the transmission-side PDCP entity, PDCP concatenation processing of concatenating a plurality of PDCP Service Data Units (SDUs) and thereby generate a PDCP PDU comprising a concatenated SDU by inserting a partition code between each of the plurality of PDCP SDUs constituting the concatenated SDU;

performing, by the reception-side PDCP entity, PDCP segmentation processing of segmenting the concatenated SDU comprised in the PDCP PDU into the plurality of PDCP SDUS; and transmitting control information used for control of the PDCP concatenation processing and/or the PDCP segmentation processing to another communication apparatus.

* * * * *